(12) United States Patent
Berry et al.

(10) Patent No.: US 9,374,553 B2
(45) Date of Patent: Jun. 21, 2016

(54) SYSTEMS AND METHODS FOR IDENTIFYING AND MERGING RECORDED SEGMENTS BELONGING TO THE SAME PROGRAM

(71) Applicant: Rovi Guides, Inc., Santa Clara, CA (US)

(72) Inventors: Joshua Berry, Blackwood, NJ (US); Jia Jane Wu, Jersey City, NJ (US)

(73) Assignee: Rovi Guides, Inc., San Carlos, CA (US)

( * ) Notice: Subject to any disclaimer, the term of this patent is extended or adjusted under 35 U.S.C. 154(b) by 191 days.

(21) Appl. No.: 13/847,196

(22) Filed: Mar. 19, 2013

(65) Prior Publication Data

US 2013/0216207 A1    Aug. 22, 2013

Related U.S. Application Data

(63) Continuation of application No. 12/187,026, filed on Aug. 6, 2008, now abandoned.

(51) Int. Cl.
| | |
|---|---|
| *H04N 5/76* | (2006.01) |
| *H04N 5/93* | (2006.01) |
| *H04N 5/91* | (2006.01) |
| *G11B 27/034* | (2006.01) |
| *G11B 27/28* | (2006.01) |
| *G11B 27/36* | (2006.01) |
| *H04N 21/433* | (2011.01) |

(52) U.S. Cl.
CPC .............. *H04N 5/93* (2013.01); *G11B 27/034* (2013.01); *G11B 27/28* (2013.01); *G11B 27/36* (2013.01); *H04N 5/76* (2013.01); *H04N 5/91* (2013.01); *H04N 21/4334* (2013.01)

(58) Field of Classification Search
CPC ........................................................ H04N 5/76
USPC ......................................................... 386/282
See application file for complete search history.

(56) References Cited

U.S. PATENT DOCUMENTS

| | | | | |
|---|---|---|---|---|
| 2003/0219228 | A1* | 11/2003 | Thiagarajan et al. | 386/83 |
| 2006/0037048 | A1* | 2/2006 | DeYonker et al. | 725/58 |
| 2008/0086743 | A1* | 4/2008 | Cheng et al. | 725/38 |

* cited by examiner

*Primary Examiner* — Hung Dang
*Assistant Examiner* — Girumsew Wendmagegn
(74) *Attorney, Agent, or Firm* — Ropes & Gray LLP

(57) ABSTRACT

Systems and methods for providing an interactive media guidance application for merging recorded video segments that are from the same program are provided. In response to a recording interruption, the interactive media guidance application may record multiple video segments. After recording the segments, the interactive media guidance application may search for and merge these segments to form a single recording. In some embodiments, the interactive media guidance application may detect the presence of a previously recorded segment. After detecting the previously recorded segment, the interactive media guidance application may automatically record the video following the end of the previously recorded segment. The interactive media guidance application may use data associated with the segments and other media cues to match the segments. The interactive media guidance application may also identify the duration of the recorded video content and provide choices for recording the video again.

20 Claims, 17 Drawing Sheets

The West Wing

Season 4, Episode 5 — "Game On"
Recorded on Wed 4/27 at 7:00pm (NBCHD)

37 min of 60 min recorded 22 min / 23 min / 15 min

RECORDED VIDEO LISTINGS:

| The West Wing | 37 min |
| South Park | 30 min |
| South Park | ⓘ Expires in 10 days 22 min |
| The Office | 27 min |
| New York: A Documentary Film | 60 min |

FIG. 5

SYSTEMS AND METHODS FOR IDENTIFYING AND MERGING RECORDED SEGMENTS BELONGING TO THE SAME PROGRAM

CROSS-REFERENCE TO RELATED APPLICATIONS

This application is a continuation of U.S. patent application Ser. No. 12/187,026 filed Aug. 6, 2008, which is hereby incorporated herein in its entirety.

BACKGROUND OF THE INVENTION

This invention relates generally to media systems and, more particularly, to systems and methods for merging recorded segments belonging to the same program in response to a recording interruption.

Media systems, such as digital video recorders (DVRs), personal video recorders (PVRs), and other local or remote storage systems for recording and managing media (e.g., television programs) are known. These media systems usually include media guidance applications, such as interactive television program guides, which allow users to perform numerous functions relating to the available media. For example, the user may, among other things, view a list of recordings stored on the media system, view detailed information for each recording, play a recording, delete recordings from the media system, and schedule videos for recording on the media system.

Conventional media guidance applications, however, are limited in their ability to respond to recording interruptions. For example, a media guidance application may be in the middle of recording video when power is cutoff. Once power is restored, the media guidance application may restart recording, creating a second recording of the remaining segment of the video. When the user then tries to watch the video, the user's viewing experience is suboptimal because some video failed to be recorded and each segment of recorded video needs to be found and selected for playback. Furthermore, in some cases, the user may not even know how to find the second recording because it is not clearly identified.

In addition to playback, other tasks associated with the video are also problematic. For example, in order to delete the video, users need to delete each recorded segment individually.

Moreover, in conventional media guidance applications, it is sometimes difficult for a user to determine that a video is incomplete in some cases and then figure out a way to re-record the video. For example, if a user detects that a recording is incomplete (e.g., by noting an inconsistency between the scheduled length and the recorded length or by watching the recorded portion), to get a complete copy, the user typically needs to conduct a manual search for a future airing of the video, which may be time-consuming and cumbersome. In some situations, the user may not even realize that the first recording is incomplete until days later. By that time, the user may have already missed several opportunities to re-record the video.

SUMMARY OF THE INVENTION

In view of the foregoing, a more intelligent solution for recording videos is provided. An interactive media guidance application automatically merges recorded segments of the same program to form a single recording.

In some embodiments, a recording control application attempts or initiates a first recording of a video, recording a first segment of the video until a recording interruption occurs. In response to the recording interruption, the recording control application attempts or initiates a second recording of the video, recording a second segment of the video, and merges the two segments of the video to form a single recording. The recording control application is any suitable application for controlling the recording of video on a recording device and, in some embodiments, providing a user interface for recording related features. For purposes of clarity, and not by way of limitation, the recording control application is described as a type of interactive media guidance application, more specifically, an interactive television program guide.

In some cases, the first and second recordings may have been necessitated by a recording interruption. For example, a system failure may occur, such as an interruption of a transmission of the video (e.g., loss of streams in switched digital video (SDV) systems), a power failure, or an equipment failure (e.g., recording medium failure). For instance, the interactive media guidance application may be recording an episode of a television series from a broadcast source when the recording is interrupted (e.g., by a power failure). As another example, the user may interrupt a recording accidentally, such as by changing the channel or turning off the system. As yet another example, an emergency alert may interrupt a recording. As a further example, the first segment of video may be corrupted.

Thus, in response to receiving a suitable input (e.g., detecting a recording interruption or receiving a suitable user input), the interactive media guidance application may merge multiple recording segments to form a single recording. Any suitable approaches may be used to detect a recording interruption. For example, after making a recording (e.g., a second recording), the application may automatically search for another video recording that is from the same program (e.g., a first recording with the same schedule, description, and/or title). As another example, a first recording with a length that is substantially less than the total duration of the program (e.g., the total duration may be provided by a program database that includes a description of the program) may be suspected of being an interrupted recording.

The interactive media guidance application may determine that the first and second recordings are segments of the same program in one or more ways. For example, the interactive media guidance application may compare the data associated with the first and second recordings. As another example, if data cannot be located for either segment, the interactive media guidance application searches for matching media cues in the video signals. For instance, the interactive media guidance application may use face recognition to search for the same people in the segments. In addition, the interactive media guidance application may use voice recognition to search for the same voices in the segments.

In some embodiments, the interactive media guidance application may determine that the first and second recordings are segments of the same program by extracting a plurality of still frames from both recordings, isolating objects from the plurality of still frames, comparing a first isolated object to the other isolated objects to determine a first match count for each of those objects that closely resemble the first isolated object, comparing each of the rest of the isolated objects to the other objects to determine a match count for each, selecting a subset of the objects from each recording, wherein the subset comprises N objects from each recording with the highest match counts, and determining the average match count between the N objects from the first recording and the N objects from the second recovering, wherein if the average match count exceeds a threshold, the two recordings are determined to be segments of the same program.

After determining that the first and second recordings are segments of the same program, the interactive media guidance application merges the first and second segments to form a single recording. For example, the interactive media guidance application may merge the first and second segments by concatenating or logically appending the second segment to the end of the first segment.

In some embodiments, rather than recording a second segment of video, the interactive media guidance application may directly merge the first segment of video with video that is currently being received. For example, the interactive media guidance application may attempt to detect the presence of the first segment of video. After locating the first segment, the interactive media guidance application may form a single recording by automatically recording the current video following the end of the first segment. As another example, following an event that may potentially interrupt a recording (such as a power failure or an emergency alert), the interactive media guidance application may check a log of recordings that were in progress within a given prior timeframe or search a local memory for segments of videos that may have been partially recorded.

In some cases, after forming the merged recording, the interactive media guidance application may alert the user to the input that triggered the merge (e.g., a recording interruption such as a system failure or a user input). For example, the interactive media guidance application may mark a listing (e.g., a recorded video listing) for the recording of the first segment, the second segment, and/or the single recording as incomplete or corrupted. As another example, the interactive media guidance application may display an alert prompt that provides information about the recording interruption or the user input.

Furthermore, the interactive media guidance application may determine that the single recording has insufficient video content. For example, the interactive media guidance application may compare the duration of the recording to the duration or the video in its originally distributed form. The interactive media guidance application may obtain the duration based on data associated with the video. Or, for example, the interactive media guidance application may compare the duration of the recording to the duration or a typical television broadcast. As another example, the interactive media guidance application may directly determine the amount of video content that is in the single recording based on a broadcast schedule provided by the media source.

If the interactive media guidance application determines that the single recording has insufficient video content (e.g., if the duration is below a certain threshold), the interactive media guidance application may provide a choice for recording the video again. In response to the user selecting a recording choice, the interactive media guidance application may attempt to acquire the video. In some embodiments, in response to the user selecting a choice for obtaining the video from a non-on-demand source (e.g., a regular cable or satellite television channel), the interactive media guidance application may re-record the video on a later airing. In some embodiments, in response to the user selecting a choice for obtaining the video from an on-demand source, the interactive media guidance application may directly acquire the video or set a bookmark reference to the content in a recordings list.

BRIEF DESCRIPTION OF THE DRAWINGS

The above and other features of the present invention, its nature and various advantages will be more apparent upon consideration of the following detailed description, taken in conjunction with the accompanying drawings, and in which:

FIGS. 5 and 6 show illustrative recorded video listing display screens after a merged recording has been created in accordance edit one embodiment of the invention;

DETAILED DESCRIPTION OF THE INVENTION

Although the embodiments described below may refer to recording in broadcast digital or analog television systems, it is to be clearly understood that the systems and methods of the invention may be used with any suitable video or audio content (i.e., on-demand or recorded content) in any suitable media system (e.g., radio-frequency broadcast, cable, satellite, on-demand, and IPTV system) in which video or audio content is received and displayed simultaneously by a user device.

Figure 1:
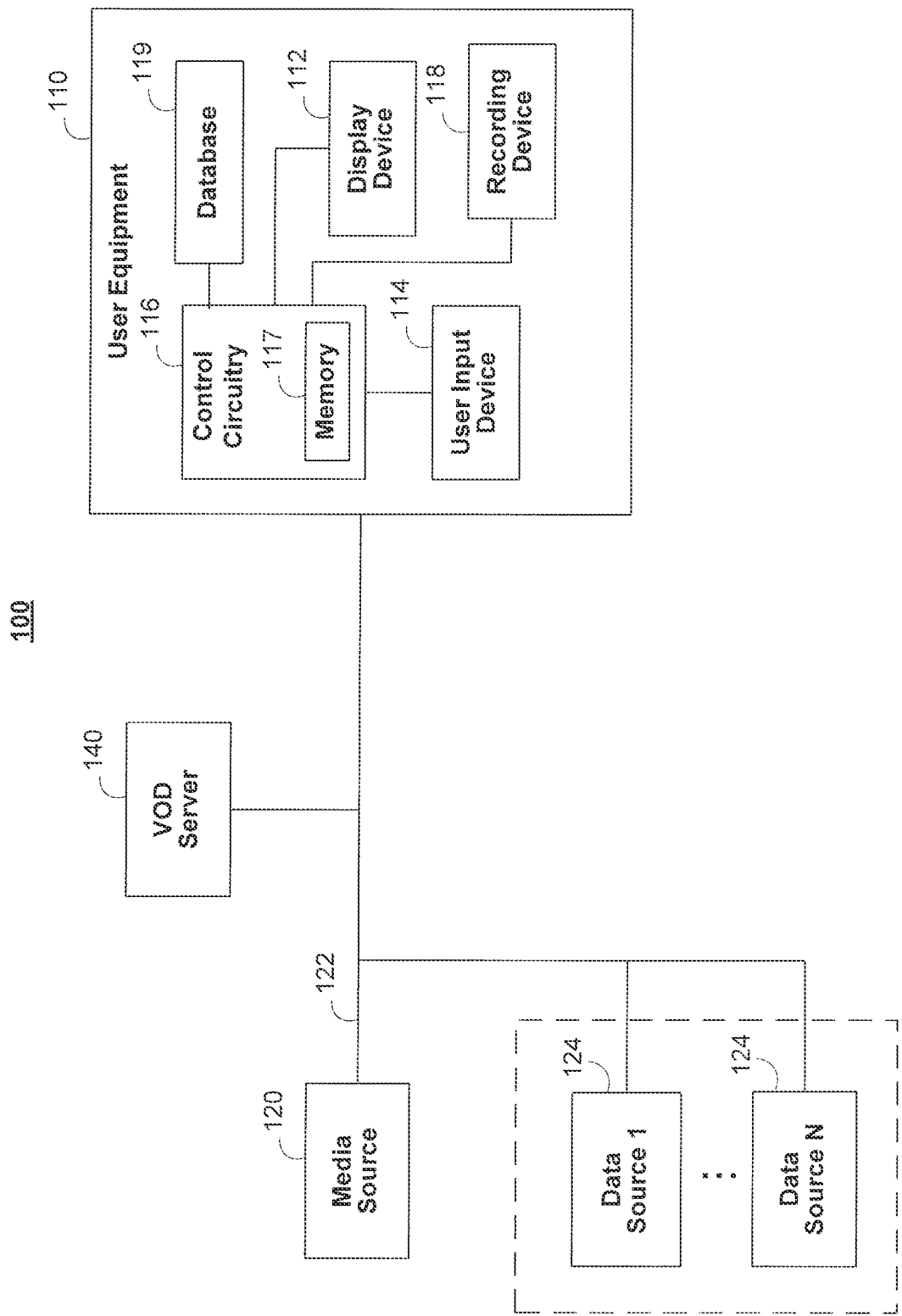
FIG. 1 shows an illustrative interactive media system in accordance with one embodiment of the invention.

FIG. 1 shows illustrative interactive media system 100 in accordance with one embodiment of the invention. User equipment 110 receives videos in the form of signals from media source 120 over communications path 122. In practice there may be multiple media sources 120 and user equipment 110, but only one of each has been shown in FIG. 1 to avoid over-complicating the drawing.

Media source 120 may be any suitable media source such as, for example, a cable system headed, satellite media distribution facility, media broadcast facility, Internet protocol television (IPTV) head end, on-demand server (e.g., VOD server), website, game service provider (e.g., for online gaming), SDV system (e.g., comprising SDV manager, edge-resource manager, and edge-QAM subsystems) or any other suitable facility or system for originating or distributing videos. Media source 120 may be configured to transmit signals over any suitable communications path 122 including, for example, a satellite path, a fiber-optic path, a cable path, an Internet path, or any other suitable wired or wireless path. The signals may carry any suitable videos such as, for example, television programs, games, music, news, web services, video, or any other suitable types of media. In some embodiments, media source 120 may include control circuitry for executing requests from a trick-play client or an interactive media guidance application implemented in, for example, user equipment 110 or a VOD server.

User equipment 110 may include any equipment suitable for providing an interactive media experience. User equipment 110 may include television equipment such as a television, set-top box, recording device, video player, user input device, or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a home theatre consumer electronic device such as, for example, a gaming system (e.g., X-Box, PlayStation, or GameCube) or a portable consumer electronic device, such as a portable DVD player, a portable gaming device, a cellular telephone, a PDA, a music player (e.g., MP3 player), or any other suitable home theatre or portable device.

In the example of FIG. 1, user equipment 110 includes at least control circuitry 116, display device 112, and user input device 114 which may be implemented as a separate device or as a single device. User equipment 110 may optionally include recording device 118 which may be implemented as a separate device or as a single device. An interactive media guidance application may be implemented on user equipment 110 to provide media guidance functions to the user for videos displayed on display device 112. In addition to or instead of the interactive media guidance application, it will be understood that any suitable type of application may be used to provide media features to the user, such as for example an interactive television application, a trick-play client, a recording control application, or any other application.

Display device 112 may be any suitable device such as, for example, a television monitor, a computer monitor, or a display incorporated in user equipment 110 (e.g., a cellular telephone or portable music player display). Display device 112 displays the videos transmitted by media source 120 over path 122, and the displays of the trick-play client. Display device 112 may also be configured to provide for the output of audio.

User input device 114 may be any suitable device for interfacing with the interactive media guidance application. For example, user input device 114 may be a remote control, keyboard, mouse, touch pad, touch screen or voice recognition interface. User input device 114 may communicate with user equipment 110 and control circuitry 116 using any suitable communications link. For example, user input device 114 may use an infra-red (IR), radio-frequency, Bluetooth, wireless (e.g., 802.11), wired, or any other suitable communications link. The information received by user input device 114 may either be classified as a source selection command or a guidance application navigation command. A source selection command may include a channel change selection, video on demand selection, digital video recorder selection, or any suitable selection that causes the user to view content different than the content the user is currently viewing. The content the user is currently viewing may be defined as content that is currently being displayed on the display device 112. A guidance application navigation command may include any suitable command that allows the user to change the information displayed in the interactive media guidance application.

Control circuitry 116 is adapted to receive user inputs from user input device 114 and execute the instructions of the interactive media guidance application. Control circuitry 116 may include one or more tuners (e.g., analog or digital tuners), encoders and decoders (e.g., MPEG decoders), processors (e.g., Motorola 68000 family processors, or MIPS family processors), memory 117 (e.g., RAM and hard disks), communications circuitry (e.g., cable modem circuitry), input/output circuitry (e.g., graphics circuitry), connections to the various devices of user equipment 110, and any other suitable component for providing analog or digital video programming, video recording, and interactive media guidance features. In some embodiments, control circuitry 116 may be included as part of one of the devices of user equipment 110 such as, for example, part of display device 112 or any other device (e.g., a set-top box, television and video player).

In some embodiments, control circuitry 116 may include a processor (e.g., a microcontroller or microprocessor) that receives and executes interactive media guidance application instructions. Memory 117 may include random-access memory for use when executing applications. Nonvolatile memory may also be used to store a boot-up routine or other instructions. In other embodiments, interactive media guidance application instructions may be executed in other suitable stand alone hardware.

Recording device 118 may be a personal video recorder (PVR), digital video recorder (DVR), video cassette recorder (VCR), DVD-recorder, compact disc recorder, or any other suitable recording device or storage device. In some embodiments, recording device 118 may be a storage device for storing or recording content or data recorded or provided by other components of interactive media system 100 (e.g., a storage device for caching live television programs to enable trick play functions). Recording device 188 may store a recording or video as a segment. Recording device 118 may include one or more tuners, and may be configured to cache video as the user receives it with user equipment 110 (e.g., cache the currently tuned channel) to provide trick-play functions for the user.

A hard disk and other storage in recording device 118 may be used to support databases. For example, user equipment may include database 119 for storing media guidance information for recorded videos and/or video data obtained from various media sources. A hard disk or other storage in recording device 118 may also be used to record videos such as television programs or video-on-demand content or other content provided to recording device 118.

In some embodiments, recording device 118 may include IR communications circuitry or other suitable communications circuitry for communicating with a remote control (e.g., with user input device 114). Recording device 118 may also include dedicated buttons and a front-panel display. The front-panel display may, for example, be used to display the current channel to which the recording device is tuned.

In serve embodiments, recording device 118 may be a network recording device that is located outside of user equipment 110. In some embodiments, the network recording device may be incorporated in media source 120 (e.g., at the head-end of a cable plant), data source 124, VOD server 140, user equipment 110 (e.g., as a second recording device, or a hard drive on a home computer), an Internet server (not shown), or any other suitable device. In some embodiments, the network recording device may be a stand alone device (e.g., a commercial network recording device, or a DVR device in a home or neighborhood network). The network recording device may receive instructions to perform recordings from the interactive media guidance application implemented on any of a plurality of instances of user equipment 110.

In some embodiments, the interactive media guidance application may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to media source 120, and data sources 124. A single user may also have multiple instances of user equipment 110. But for the clarity of the figure, the equipment of only a single user is shown. The equipment of the plurality of users may be connected to media source 120 and data sources 124 using a cable television network, a satellite television network, a local area network (LAN), a wireless network, the Internet (e.g., using a DOCSIS modem), or any other suitable means. In some embodiments, the equipment of the plurality of users may be connected to each other using any suitable means.

User equipment 110 may receive interactive media guidance application data (e.g., data for storing the data structure of FIG. 3, discussed below) from one or more data sources 124. Data sources 124 may provide data associated with a particular type of video or for a particular application. Data that may be associated with videos may include, for example, title, genre, actors, duration of the video, date of broadcast, or any other suitable type of data. One data source 124 may provide data for non-on-demand media (e.g., non-pay and pay-per-view programs), and another may provide data for on-demand media (e.g., VOD programs). Or, for example, a single data source may provide both of these types of data. For example, one data source 124 may provide data for an interactive media guidance application. Another data source 124 may, for example, provide data for another interactive application (e.g., a home shopping application, and real-time data such as sports scores, stock quotes, news data and weather data). In some embodiments, data sources 124 may provide data to the interactive media guidance application using a client/server approach. There may be one server per data source, one for all sources or, in some embodiments, a single server may communicate as a proxy between user equipment 110 and various data sources 124. In such embodiments, data source 124 may include control circuitry for executing the instructions of the interactive media guidance application. The data provided by data source 124 may be periodically downloaded in part (e.g., updated) or in whole to memory 117 of control circuitry 116.

In some embodiments, interactive media system 100 may also include video on demand (VOD) server 140. FIG. 1 shows media source 120, data sources 124, and VOD server 140 as separate elements. In practice, their functionality may be combined and provided from a single system at a single facility, or multiple systems at multiple facilities. For example, a separate data source 124 may be associated with each of a plurality of television broadcasters and may provide data that is specific to those broadcasters (e.g., advertisements for future programming of the broadcasters, or logo data for displaying broadcasters' logos in interactive media guidance application display screens).

Figure 2:
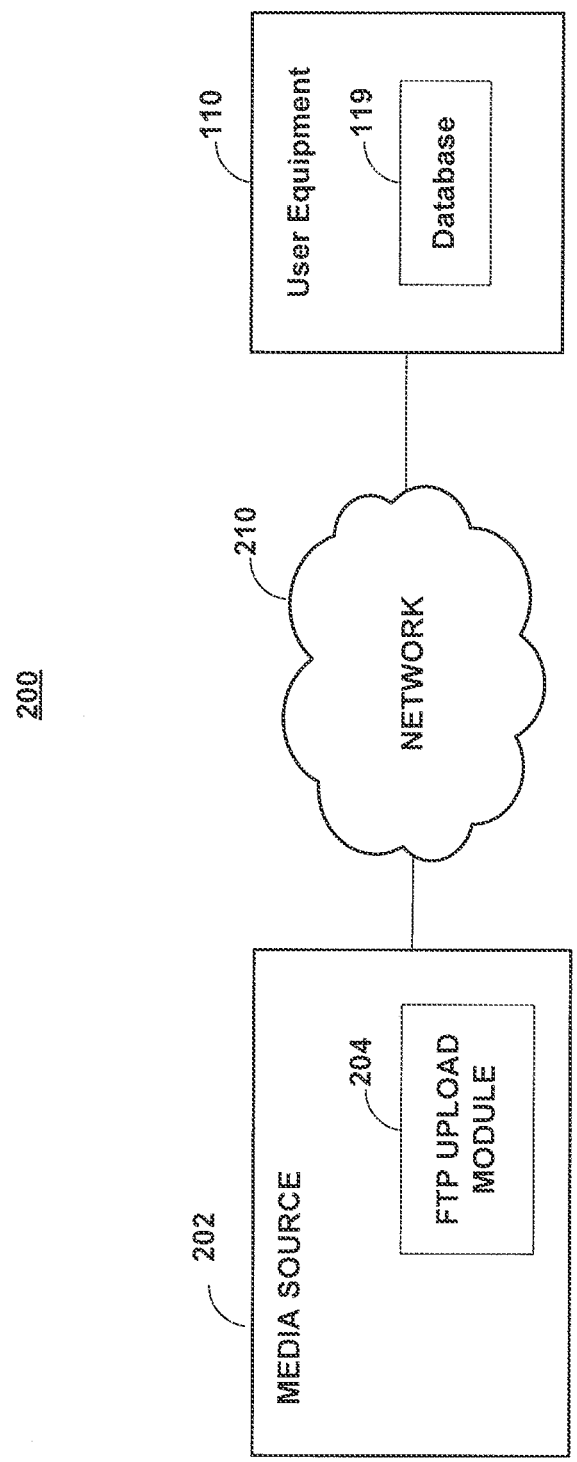
FIG. 2 shows an illustrative network for supplying videos via a media source in accordance with one embodiment of the invention.

FIG. 2 shows illustrative network 200 for supplying videos via a media source in accordance with one embodiment of the invention. Although user equipment 110 can include any or the components shown in FIG. 1, only database 119 is shown in FIG. 2 to avoid overcomplicating the drawing.

Media source 202 may be the same as or similar to media source 120 of FIG. 1. For example, media source 202 may include any video source such as, for example, IPTV head end, websites (e.g., FTP websites), on-demand server, online video rental stores, or any other suitable provider for originating or distributing videos. In the example given in FIG. 2, media source 202 may include the functionality of a data source (e.g., data source 124 of FIG. 1) and may send videos and data associated with the videos to user equipment 110 over network 210. Network 210 may include any one-way or two-way network, including a cable network, fiber-optic network, satellite network, cellular data network, or the Internet.

Media source 202 may transmit videos and data (e.g., title, genre, actors, duration of the videos, and date of broadcast) over network 210 using FTP upload module 204. Video data may be uploaded automatically to a database (e.g., database 119) stored on a recording device (e.g., recording device 118 of FIG. 1). Database 119 may be indexed by any suitable field, including media source information and video data fields. After database 119 has been populated, an interactive media guidance application may search for videos on media source 202 by generating database queries containing one or more data fields. For example, the interactive media guidance application may search for a particular episode of a television show based on the show's title, season number, and episode number. Once a match has been found, the interactive media guidance application may send a request to media source 202 to download the video.

Instead of searching database 119 for video data, in some embodiments, user equipment 110 automatically searches for videos on media source 202. For example, the interactive media guidance application may send a request for a video to media source 202 over network 210. The request may include data associated with the video. A web service or process may execute on media source 202 that automatically processes this request. After the request has been authenticated, the web service or process may search for the video. If a match is found, the web service or process may use FTP upload module 204 to deliver the video directly to user equipment 110 (FIG. 1).

Although the above discussion uses FTP as a protocol for transferring data, any other suitable transferring protocol may be used, such as secure FTP (SFTP), secure copy protocol (SCP), or secure shell (SSH). Other streaming and transport protocols may also be used, including RTP and MPEG-2 transport. In addition, any suitable transferring mechanism or mechanisms may be used to deliver data to user equipment 110. For example, user equipment 110 may use web crawling techniques to populate database 119. As another example, data may be sent in serialized object form or in a suitable mark-up language format (e.g., XML). For instance, FIG. 3 shoes an illustrative data structure that includes data associated with videos in accordance with one embodiment of the invention. In one embodiment, this data structure may correspond to the structure of the data provided by data source 124 (FIG. 1).

XML file 300 may include data associated with one or more videos. In some embodiments, the interactive media guidance application may search for videos on various media sources (e.g., media source 120 of FIG. 1 or media source 202 of FIG. 2) by sending requests in a format similar to XML file 300. In some embodiments, the media sources may send data to populate a database on user equipment 110 (e.g., database 119 of FIGS. 1 and 2) in a format similar to XML file 300.

Although Extensible Markup Language (XML) is used in the example of XML file 300, any suitable mark-up language may be used, including, for example, any subset of Standard Generalized Markup Language (SGML). In addition, although the example of XML file 300 uses ISO/IEC 8859 encoding, any other suitable encoding (e.g., UTF-8, UTF-16, or UTF-32) may be used. Any suitable video metadata format may also be used, such as the CableLabs Video-On-Demand Metadata standard.

XML file 300 includes title 302, which may include a unique media source identifier. Body 304 of XML file 300 may include a number of tags that define the data associated with the one or more videos. A "name" tag may identify the name or title of the video. A "subname" tag may identify the subtitle (or episode Title) of the video. A "desc" tag may include a text summary or description of the video, an identification of the cast, director, and/or players (e.g., teams and/or athletes) in the video.

Figure 3:
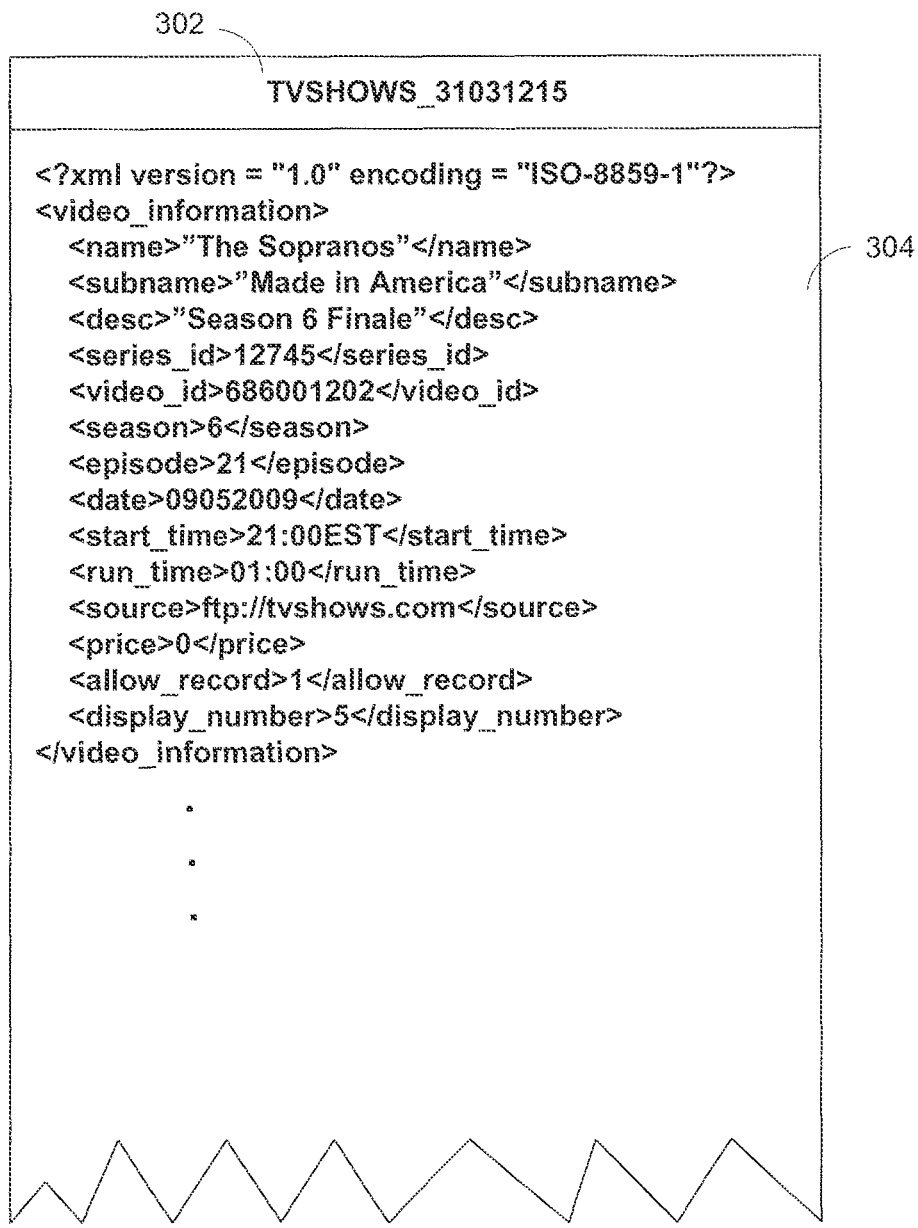
FIG. 3 shows an illustrative data structure that includes data associated with videos in accordance with one embodiment or the invention.

A series identifier tag (e.g., "series_id") may uniquely identify a series, if applicable. For example, as shown in FIG. 3, the current video is the season finale of "The Sopranos." This video may be associated with a series identifier that uniquely identifies the series, "The Sopranos." A video identifier tag (e.g., "video_id") may also be included in XML file 300 to uniquely identify the video. The video identifier may be unique among a subset of videos or all videos available within media system 100 (FIG. 1). For example, if the video is a part of a series, the video identifier may uniquely identify the episode within the series or, alternatively, uniquely identify the episode among all available media content. As such, media source 202 (FIG. 2) may be in communication with an identifier database that uniquely allocates new video and series identifiers for new videos (e.g., a new movie or a new episode of a show). The identifier database may be maintained by the cable operator, MSO, or a third-party. As described in more detail below, the interactive media guidance application may use the unique video and/or series identifiers to search for videos on multiple media sources. For example, the interactive media guidance application may use the unique identifiers to search for a particular video to download from an Internet source. As another example, the interactive media guidance application may use the unique identifiers to determine when a particular video is scheduled to be re-broadcast in the broadcast video listings of a cable source.

"Season" and "episode" tags may identify the season and episode numbers, respectively. A "date" tag may identify the scheduled broadcast date of the video. "Start_time" and "run_time" tags may identify the scheduled start time and the scheduled duration of the video, respectively. A "source" tag may identify the channel number, channel name, or source of the video (e.g., NBCHD, channel 5, or a website).

XML file 300 may also include a "price" tag. The price tag may identify the estimated access price for the video. For example, accessing the video (e.g., via an on-demand server or an online video rental store) may be associated with an access charge or subscription fee. For videos broadcast on a non-on-demand source (e.g., a regular cable or satellite television channel that the user subscribes to), the price tag will generally indicate that the video is associated with a zero price (e.g., access to the video is free). Some non-zero price may be included in the price tag to indicate that a charge is associated with accessing the video.

Finally, XML file 300 may also include a number of advanced content control tags. These tags may specify what type of video access is granted to the user equipment when the video is made available. These advanced content control tags may be saved to the user equipment (e.g., included in database 119 of FIGS. 1 and 2) and enforced when the video is being accessed by the user equipment. Some of these tags may be used to control unauthorized copying, distribution, or retransmission of the video. The interactive media guidance application may enforce all convent control tags on the user equipment. For example, an "allow_record" tag may indicate whether the video is permitted to be saved to the user equipment (e.g., to recording device 118 of FIG. 1). In some embodiments, the allow recordings tag may prohibit caching and buffering of the video. For example, if the "allow_record" is set to "0", the user equipment may not automatically buffer the output of tuners that are tuned to the video. This may help prevent unauthorized recording or saving of restricted videos to the user equipment. In some embodiments, the allow recordings tag may be associated with various parameters. For example, the "allow_record" tag may be associated with an expiration date such that the video may automatically be deleted from the recording device once the expiration date has passed. As another example, the "allow_record" tag may be associated with a parameter that indicates whether the video has been viewed such that the video may automatically be deleted once the video has been viewed.

The "display_number" tag may indicate the number of times the user is authorized to view the video. For example, this tag may indicate the number of times the user may request the video via an on-demand service or the number or times playback is permitted from a recording device (e.g., recording device 118 of FIG. 1). Other supported content control tags may include tags for limiting or prohibiting retransmission of the video, editing of the video, and/or sampling of the video (e.g., for digital audio content). In some embodiments, the interactive media guidance application may interface with a digital rights management (DRM) application in order to request additional access permissions, as desired by the user.

The interactive media guidance application on the user equipment merges (e.g., logically appends and/or concatenates) recordings of video segments that are determined to be segments of the same program. For example, an interactive media guidance application attempts or initiates a first recording of a video, recording a first segment of the video until a recording interruption occurs. In response to the recording interruption, the interactive media guidance applications attempts or initiates a second recording of the video, recording a second segment of the video, and merges the two segments of the video to form a single recording.

In some cases, the first and second recordings may have been necessitated by a recording interruption. For example, a system failure may occur, such as an interruption of a transmission of the video (e.g., loss of streams in switched digital video (SDV) systems), a power failure, an equipment failure (e.g., recording medium failure), or any other type of system failure. For instance, the interactive media guidance application initiates a first recording of a video and the first recording is ended prematurely due to a power failure. In response to detecting the power failure, the interactive media guidance application initiates a second recording of the video. As another example, the user may interrupt a recording accidentally, such as by changing the channel or turning off the system. In response to a user command (e.g., the user pressing a "record" button), the interactive media guidance application may initiate a second recording of the video. As yet another example, an emergency alert may interrupt a recording. As a further example, the first segment of video may be corrupted.

Figure 4:
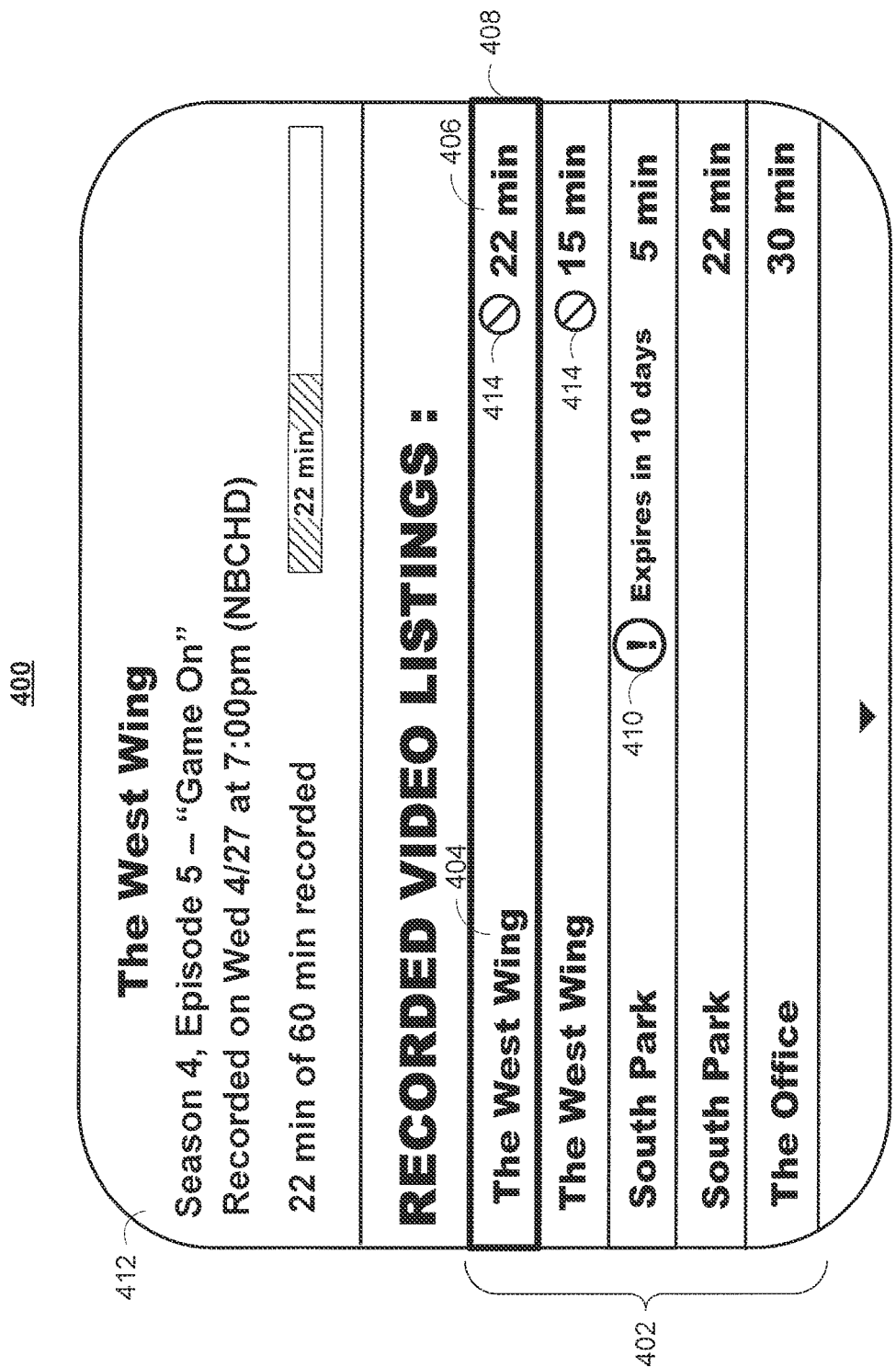
FIG. 4 shows an illustrative recorded video listing display screen in accordance with one embodiment of the invention.

In some embodiments, the first and second recordings may initially be displayed in a recorded video listing. For example, as shown in FIG. 4, display screen 400 includes recorded video listings 402, which displays a listing of videos currently accessible on the user equipment (e.g., on recording device 118 of FIG. 1 or media source 120 of FIG. 1 or media source 204 of FIG. 2). Each listing in recorded video listings 402 may include various types of information. For example, title information 404 may provide the title of the video, and duration information 406 may provide the total length of the video. The user may navigate the listings in recorded video listings 402 by entering appropriate commands using a user input device (e.g., user input device 114 of FIG. 1). For example, if the user input device is a remote control, the user may position highlight region 408 by selecting "UP" and "DOWN" cursor keys. If the user repeatedly moves highlight region 408 until highlight region 408 reaches the bottom of recorded video listings 402, further attempts at downward movement will cause the listing to scroll in the vertical direction.

In some embodiments, recorded video listings 401 may include videos obtained from multiple media sources. For example, recorded video listings 402 may include videos from broadcast sources that are recorded on the user equipment. As another example, videos and associated content control tags may be downloaded to the user equipment from an Internet source. The content control tags may be saved in a database (e.g., database 119 of FIGS. 1 and 2) on the user equipment. Based on the associated content control tags (e.g., "allow_record" tag or "display_number" tag of FIG. 3), the interactive media guidance application may determine access restrictions associated with the videos. For example, the interactive media guidance application may determine the expiration date for renting a video and display message alert 410 which notifies the user of when the video will be deleted. As shown in FIG. 4, message alert 410 indicates that "South Park" expires in 10 days. Thus, the user has 10 days to watch the video, and after 10 days, the interactive media guidance application will delete the video from the recording device. As another example, based on the "display_number" tag associated with the video, the interactive media guidance application may determine the number of times the video may still be played back before it is no longer accessible. In various embodiment of the present invention, when two segments are combined, one of which has a lower display_number than the other, the video that results from combining the two segments is given the lower display_number of the two.

In addition, the interactive media guidance application may determine and display other alerts associated with copying, editing, distributing, or retransmitting. It will be understood that although recorded video listings 402 include videos obtained from multiple media sources, recorded video listings 402 may also only include videos obtained from a single source. As a result, videos obtained from different media sources may be displayed in different video listings.

Display screen 400 may include summary window 412 for displaying summary information about the video that is currently highlighted by highlight region 408. For example, summary window 412 may include the video name (e.g., "The West Wing"), the season number (e.g., "Season 4"), the episode number (e.g., "Episode 5"), and the video subname ("Game On") of the video that is currently highlighted. Persons skilled in the art will appreciate that any suitable type of information about the video may alternatively or additionally be displayed (e.g., a summary or description, rating, director, cast, and/or players).

Furthermore, display screen 400 may include indicators 414, which may be displayed next to listings of recordings that are determined to be incomplete and/or corrupted. For example, as shown in FIG. 4, indicators 414 are displayed next to listings for the first and second recorded segments of "The West Wing".

In response to receiving a suitable input (e.g., detecting a recording interruption or receiving a suitable user input), the interactive media guidance application may merge the first and second segments of a video to form a single recording. Any suitable approaches may be used to detect a recording interruption. For example, after making a recording (e.g., a second recording), the application may automatically search for another recording that is from the same program (e.g., a first recording). As another example, a first recording with a length less than the total duration of the program (e.g., the total duration may be provided by a program database such as database 119 of FIGS. 1 and 2) may be suspected of being an interrupted recording.

The interactive media guidance application may determine that the first and second recordings are segments of the same program using any suitable approach. For example, the interactive media guidance application may match the first and second recordings by searching for data associated with the first and second recordings (e.g., using broadcast video listings, data sources 124 of FIG. 1, database 119 of FIG. 1, media source 120 of FIG. 1, media source 202 of FIG. 2, or any combination thereof). Any suitable data may be used, including, for example, the name, the subname, the description, the video identifier, the series identifier, duration of the video, and/or the broadcast time of the video. As another example, the interactive media guidance application may first narrow the search by determining which recordings were made during the broadcast time of the video. After finding one or more segments, the interactive media guidance application may find the matching segments by comparing the associated data.

As yet another example, if data cannot be located for the first or second segment, the interactive media guidance application may determine that the segments are from the same program by searching for matching media cues in the video signals. The interactive media guidance application may, for example, use face recognition algorithms to search for people in the first and second segments that are the same. In addition, the interactive media guidance application may use voice recognition algorithms to search for voices in the segments that are the same. In order to produce a more reliable match, the interactive media guidance application may need to sample the video for a period of time (e.g., to reduce the likelihood that the videos being sampled include advertising content rather than video content). The interactive media guidance application may, for example, search for an image or voice in the second segment that appears the most frequently (e.g., the main character in a television show or a news anchor), and use that image or voice to search the first segment. Using a frequently occurring image or voice reduces the probability that the image or voice that is used to match video segments to each other is from a common commercial between the two programs since the commercial image or voice is less likely to occur frequently in a video segment that is substantially longer than about 30 seconds or a minute.

In some embodiments, the interactive media guidance application may determine that the first and second recordings are segments of the same program by extracting a plurality of still frames from both recordings, isolating objects from the plurality of still frames, comparing a first isolated object to the other isolated objects to determine a first match count for each of those objects that closely resemble the first isolated object, comparing each of the rest of the isolated objects to the other objects to determine a match count for each, selecting a subset of the objects from each recording, wherein the subset comprises N objects from each recording with the highest match counts, and determining the average match count between the N objects from the first recording and the N objects from the second recording, wherein if the average match count exceeds a threshold, the two recordings are determined to be segments of the same program.

In some cases, the interactive media guidance application may more efficiently search for the segments by starting the search with the last-made recording as it is more likely to belong to the video. If a match is not found, however, the interactive media guidance application may continue the search with earlier recordings. In some cases, the interactive media guidance application may also determine the broadcast time (e.g., start time and end time) of the video. After determining the broadcast time, the interactive media guidance application may search for segments that were recorded during that time period.

After the interactive media guidance application has determined that the recordings are segments of the same program, the application may merge the first and second segments to form a single recording. The single recording may thus be formed from a portion of the first segment and a portion of the second segment. In addition to merging the first and second segments, the interactive media guidance application may delete a listing for the first and/or the second recording from a recorded video listing (e.g., recorded video listings 402 of FIG. 4) so that only a single listing for the combined video remains. Alternatively, in other embodiments, listings for the first and/or second recordings may be hidden and never displayed to the user in the first place.

In some embodiments, instead of attempting a second recording of the video, the interactive media guidance application may directly merge the first segment of video with video that is currently being received. For example, the interactive media guidance application may attempt to detect the presence of a first segment of video. After locating the first segment, the interactive media guidance application may form a single recording by automatically recording the current video following the end of the first segment. As another example, following an event that may potentially interrupt a recording (e.g., a power failure or an emergency alert), the interactive media guidance application may check a log of recordings that were in progress within a given prior timeframe or search a local memory for segments of videos that may have been partially recorded.

Figure 6:
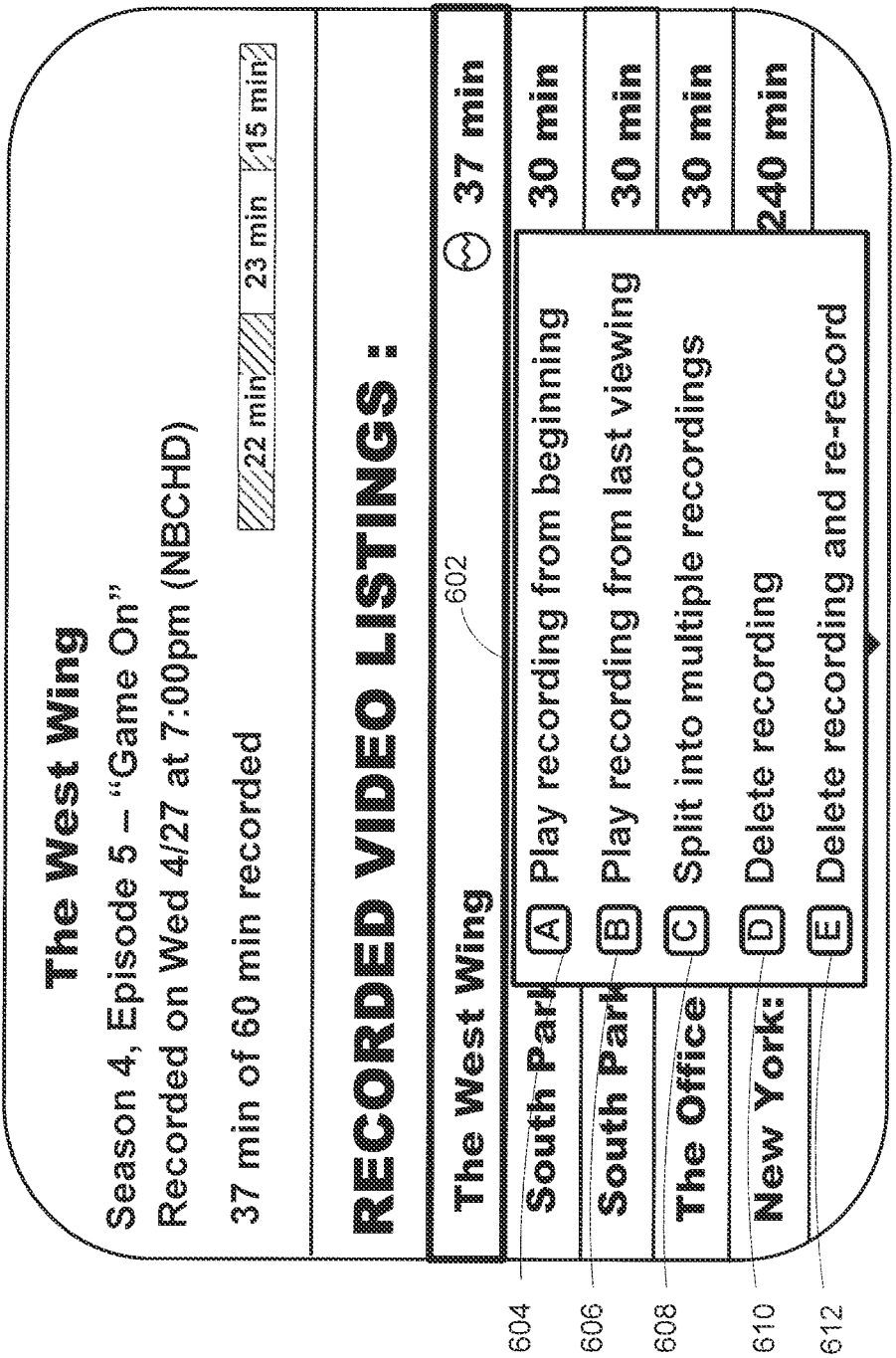

After forming the single recording, a new recorded video listing may be displayed. FIGS. 5 and 6 show illustrative recorded video listing display screens after a merged recording has been created in accordance with one embodiment of the invention. As shown in FIG. 5, the first and second segments of "The West Wing" have been deleted from recorded video listings 402.

Display screen 500 may include indicators 502, which may be displayed for listings of merged recordings (e.g., recordings that are formed from multiple segments). For example, as shown in FIG. 5, "The West Wing" and "The Office" are both merged recordings. In some embodiments, indicators 502 may be displayed for an incomplete and/or corrupted recording. The user may thus be notified if a particular recording is incomplete.

If the user places highlight region 504 over such a merged recording listing, summary window 412 may additionally provide information about the recording. For example, summary window 412 may include recording length description 506 (e.g., as shown in FIG. 5, 37 minutes of 60 minutes of "The West Wing" have been recorded). Summary window 412 may also include recording indicator 508. Recording indicator 508 may display the segments that have been recorded for a particular video. For example, as shown in FIG. 5, segments 510 indicate that the first 22 minutes and the last 15 minutes of the video have been recorded. Segment 512 indicates that twenty-three minutes are missing in the middle of the recording. In some embodiments, the length of the segments in recording indicator 508 may be scaled such that the length corresponds to the time duration of the segments. In some embodiments, when a recording is stitched together from multiple segments, a graphic, video and/or audio clip is inserted in the resulting video at one or more of the stitch points or at the beginning of the video to notify the user about potential problems with the recording. These inband notifications can serve as alternative ways to inform or remind the user that some video may be lost within the video and explain, for example, discontinuities that the user may observe.

In response to the user selecting a recording (e.g., when a user selects a "SELECT" or "OK" key on user input device 114 of FIG. 1 when a particular listing is highlighted by highlight region 504), the interactive media guidance application may display multiple options associated with the selected recording. For example, as shown in FIG. 6, display screen 600 may provide overlay 602 that includes the multiple options. The multiple options may include any suitable type of options such as, for example, options for playing a recording from the beginning (e.g., "playback" option 604), playing a recording from the last viewing position (e.g., "playback" option 606), splitting a recording into separate recordings (e.g., "split" option 608), deleting a recording (e.g., "delete" option 610), and deleting a recording and re-recording (e.g., "delete and re-record" option 612).

If the user selects "playback" option 604, the interactive media guidance application may play the recording from the beginning of the recording. If the user selects "playback" option 606, the interactive media guidance application may play the recording from the point when the recording was last viewed. For example, if the user issues a stop command during the playback of a recording, the interactive media guidance application may keep track of the last viewing position (e.g., by saving the number of minutes into the recording when playback ended). Therefore, when the user selects the option to play the recording again from the last viewing position, the interactive media guidance application may search for and continue to play back the recording from that position.

"Split" option 608 may be an option available for segments that have been merged by the interactive media guidance application. For example, the user may select "split" option 608 if he or she is unsatisfied with the merged recording (e.g., the interactive media guidance application may have mistakenly merged two different videos). In response to the user selecting "split" option 608, the interactive media guidance application may split the merged recording into two recordings for the originally recorded segments. Alternatively, in response to the split selection, the interactive media guidance application my search for another, potentially more suitable segments to combine and even in some cases undo other merges to find a more optimal match. In the example shown in FIGS. 5 and 6, the interactive media guidance application may split the recording of "The West Wing" into a first recording of 22 minutes and a second recording of 15 minutes.

In addition, overlay 602 may include "delete" option 610 for allowing users to delete a recording. In some embodiments, in response to the user selecting "delete" option 610, the interactive media guidance application may display a prompt that confirms whether the user desires to delete the recording. If the user confirms the deletion, the interactive media guidance application may delete the recording from the recording device. Accordingly, the recording will be deleted from the recorded video listing (e.g., recorded video listings 402 of FIG. 5).

In some embodiments, in response to the user selecting "delete" option 610, the interactive media guidance application may provide additional options for the user to delete particular segments of the recording. The segments of the recording may correspond to the multiple segments that were merged to form the single recording. In the example given, the interactive media guidance application may provide options for the user to delete a first recording segment of 22 minutes, second recording segment of 15 minutes, or any combination thereof.

In some embodiments, overlay 602 may include "delete and re-record" option 612 for allowing users to delete a recording and re-record or download a new video that is associated with the recording. "Delete and re-record" options will be discussed in more detail in connection with FIG. 8.

In response to the user selecting to play back a merged recording (e.g., selecting either "playback" options 604 or 606), the interactive media guidance application may alert the user to the input that triggered the merge. For example, the input may have been a recording interruption (e.g., a system failure, an emergency alert during the first recordings a corrupted first segment of video, etc.). As another example, the input may have been a user input (see FIGS. 15 and 16).

Figure 7:
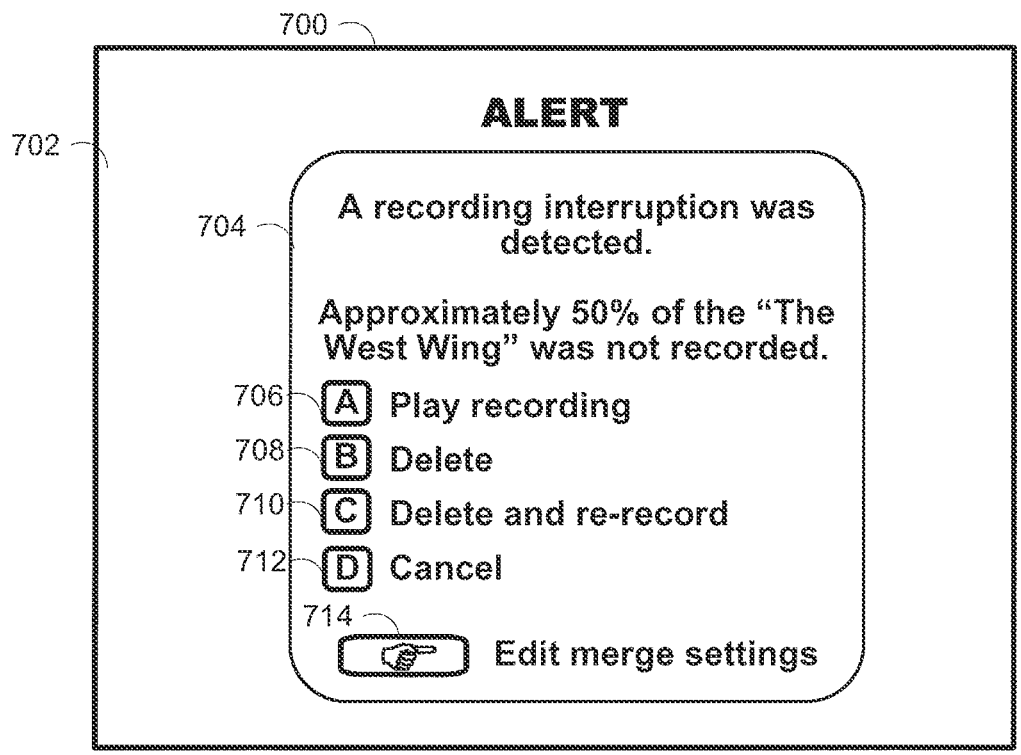
FIG. 7 shows an illustrative display screen with an alert prompt overlay that is displayed in response to receiving a playback command for a merged recording in accordance with one embodiment of the invention.

FIG. 7 shows an illustrative display screen with an alert prompt overlay that is displayed in response to receiving a playback command for a merged recording is accordance with one embodiment of the invention. Display screen 700 may include any suitable background 702. For example, display screen 700 may have a background similar to display screen 500 (FIG. 5). As another example, display screen 700 may have paused video as the background. The paused video may be a frame of the recording that the user has selected to play back (e.g., the first frame or the frame at the current viewing position).

Prompt overlay 704 may provide information about the input that triggered merging of the multiple segments (e.g., a recording interruption or a user input). For example, prompt overlay 704 may provide the user with the specific type of recording interruption (e.g., an emergency alert during the first recording, a corrupted first segment of video, an inadvertent recording interruption caused by a user, or a system failure). As another example, the duration of certain types of recording interruptions (e.g., the duration of a system failure) may be provided.

Prompt overly 704 may also include information about the content of the recording. For example, prompt overlay 704 may notify the user that there is a potential for missing video content (e.g., portion of the video that excludes advertising content) in the recording. As another example, the interactive media guidance application may determine the amount of video content that was not recorded.

The interactive media guidance application may determine the amount of video content that was not recorded using any suitable approach. For example, the interactive media guidance application may approximate this amount by comparing the duration of the recording with the total duration of the video in its originally distributed form. As another example, the interactive media guidance application may approximate this amount based on a typical television broadcast (e.g., fixed durations of video content interspersed with fixed durations of advertising content for a typical 30 or 60-minute program). As yet another example, the interactive media guidance application may compare the recording with a broadcast schedule provided by a data source (e.g., data source 124 of FIG. 1). For instance, the broadcast schedule may specify the start times, the frequency, and the duration of the advertising content. As a further example, the application may refer to interrupt service routine timestamps from a local battery backed time reference to see when recording was interrupted and when it was resumed. In some embodiments, the video is digital and carries an appropriate time reference within the video stream, such as a program clock reference or frame count, that can be used to determine the length of video missing from a multiple part recording.

In the example shown in FIG. 7, the interactive media guidance application approximates that 50% of the video content was not recorded. Is will be understood that the amount of video content that was not recorded may be provided using any suitable format, such as, for example, based on the somber of minutes (e.g., 20 minutes of 60 total minutes), on a fixed scale (5 out of 10), etc.

Prompt overlay 704 may also include multiple options (e.g., "play" option 706, "delete" option 708, "delete and re-record" option 710, and "cancel" option 712) to the user. In response to the user selecting "play" option 706, the interactive media guidance application may begin to play the video (e.g., the interactive media guidance application may play the video from the beginning if "play" option 604 of FIG. 6 was selected or from the last viewing position if "play" option 606 of FIG. 6 was selected). In response to the user selecting "cancel" option 712, the interactive media guidance application may remove prompt overlay 704 and go back to a different display screen (e.g., a recorded video listings such as recorded video listings 402 of FIG. 5, live television broadcast, or broadcast video listings).

In some embodiments, if the interactive media guidance application determines that an insufficient amount of the video content was recorded, the application may provide "delete" option 708 and/or "delete and re-record" option 710. The interactive media guidance application may use any suitable parameter for determining whether the recording has insufficient video content. For example, the interactive media guidance application may determine the parameter based on past user behavior. For instance, if the user has generally selected to delete a recording if less than 60% of the video was available, then the interactive media guidance application may set the parameter at 60%. As a result, the next time that a recording containing less than 60% of the video content is selected to be played back, the interactive media guidance application may automatically provide "delete" option 708 and/or "delete and re-record" option 710 to the user. As another example, the user may specify the parameter by defining a percentage of video content below which the recording should be deleted and re-recorded. The user may specify the duration by selecting, for example, "edit merge settings" option 714, "Edit merge settings" option 714 will be described in more detail in connection with FIG. 13.

In response to the user selecting "delete" option 708, the interactive media guidance application may delete the recording from the recording device. In some embodiments, the interactive media guidance application may display a confirmation prompt prior to deleting the recording. In some embodiments, where a log of what videos have been recorded is kept (e.g., for profile related service reasons), if a partially recorded video is deleted from the system, the log of it having been recorded may be removed as well.

In response to the user selecting "delete and re-record" option 710, the interactive media guidance application may provide the user with choices for recording the video again. For example, FIG. 3 shows an illustrative display screen with a recording choices overlay that is displayed in response to receiving a re-record command. Display screen 800 may include recording choices overlay 802 that includes multiple recording choices (e.g., choices 804, 806, and 808) for recording the video again. Recording choices overlay 802 may also be displayed in response to the user selecting "delete and re-record" option 612 (FIG. 6). By providing the re-recording choices, the user may easily record the video again without having to conduct a manual search for a future airing of the video.

Videos provided by the recording choices may be obtained from any suitable source that is available to the user (e.g., a broadcast source, an internet source, a pay-per-view source, etc.). For example, the interactive media guidance application may search the broadcast video listings for future broadcasts of the video. The interactive media guidance application may compare data associated with the future broadcasts with data associated with the video. Any suitable data may be used such as, for example, the name, the subname, the description, the video identifier, and the series identifier. The interactive media guidance application may also search a database (e.g., database 119 of FIGS. 1 and 2) to find database entries from various media sources (e.g., media scarce 120 of FIG. 1 and media source 202 of FIG. 2) that match the video data. Database queries may include any suitable data fields (e.g., the name, the subname, the description, the video identifier, and the series identifier). In addition, the interactive media guidance application may directly search for the video on the media sources. The interactive media guidance application may send a request to the media source (e.g., the request may be in a format similar to XML 300 of FIG. 3) that may include data associated with the video.

The recording choices that are provided on recording choices overlay 802 may satisfy one or more attributes. The attributes may include, for example, high-definition (HD) attributes, advertising attributes, access attributes, price attributes, and time to obtain attributes. The user may select and rack the attributes by selecting, for example, "edit merge settings" option 810.

The recording choices provided on recording choices overlay 802 may also be sorted using any suitable approach. In some embodiments, the recording choices may be sorted based on the ranked attributes. For example, the user may rank videos from cable channels higher than videos from pay-per-view channels. Thus, a recording choice that is provided by a cable channel will be displayed before a recording choice that is provided by a pay-per view channel. In ether embodiments, the interactive media guidance application may sort the recording choices based on various limitations in the system. For example, the interactive media guidance application may detect another video that is scheduled to be recorded at the same time as one of the recording choices. As a result, the recording choice may be placed lower on the list of recording choices. As another example, the interactive media guidance application may detect that the bandwidth of the network is unsuitable for downloading the video from an Internet source. As a result, recording choices from Internet sources may be placed lower on the list of recording choices. As yet another example, the interactive media guidance-application may detect that there is limited space available on the recording device. As a result, videos that occupy less space may be placed higher on the list of recording choices (e.g., the interactive media guidance application may select standard resolution videos rather than HD videos). Persons skilled in the art will appreciate that any combination of these approaches may be used to determine recording choices.

Figure 8:
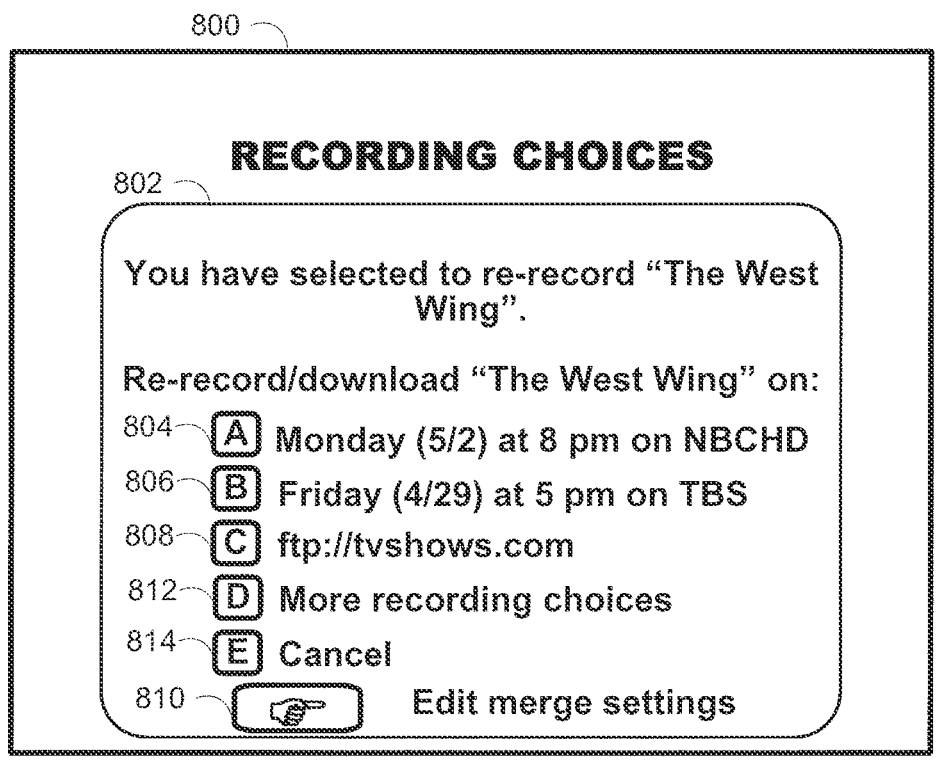
FIG. 8 shows an illustrative display screen with a recording choices overlay that is displayed in response to receiving a re-record command in accordance with one embodiment of the invention.

As shown in FIG. 8, choices 804 and 806 are future broadcasts of the video (e.g., choice 804 indicates that "The West Wing—Game On" is being re-broadcast Monday at 8 pm on NBCHD, and choice 806 indicates that the video is being re-broadcast Friday at 5 pm on TBS). In response to the user selecting choice 804 or choice 806, the interactive media guidance application may display a confirmation prompt overlay.

Figure 9:
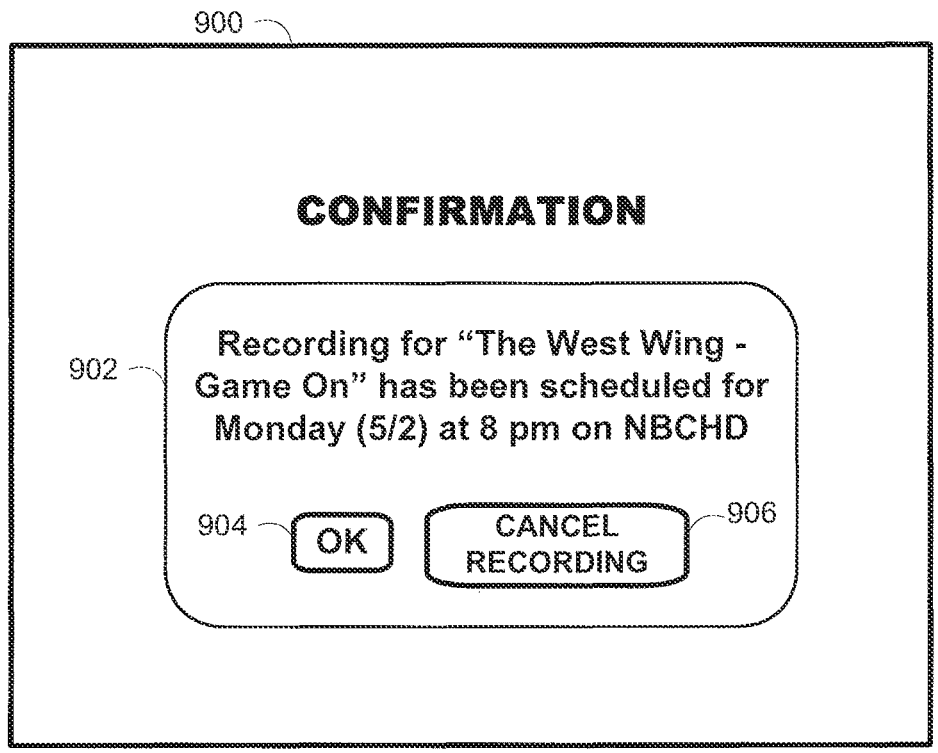
FIG. 9 shows an illustrative display screen with a confirmation prompt overlay that is displayed in response to receiving a scheduling command in accordance with one embodiment of the invention.

FIG. 9 shows an illustrative display screen with a confirmation prompt overlay that is displayed in response to receiving a scheduling command in accordance with one embodiment of the invention. Display screen 900 may include confirmation prompt overlay 902, which may indicate that the video has been scheduled for re-recording. If the user is satisfied with the selection, the user may select "OK" option 904 to confirm the scheduling. However, if the user no longer wants no re-record the video, the user may select "cancel recording" option 906 to cancel the scheduled recording. The interactive media guidance application may alert the user to scheduling conflicts, and allow the user to choose either to continue with the scheduling or select another recording choice.

Figure 10:
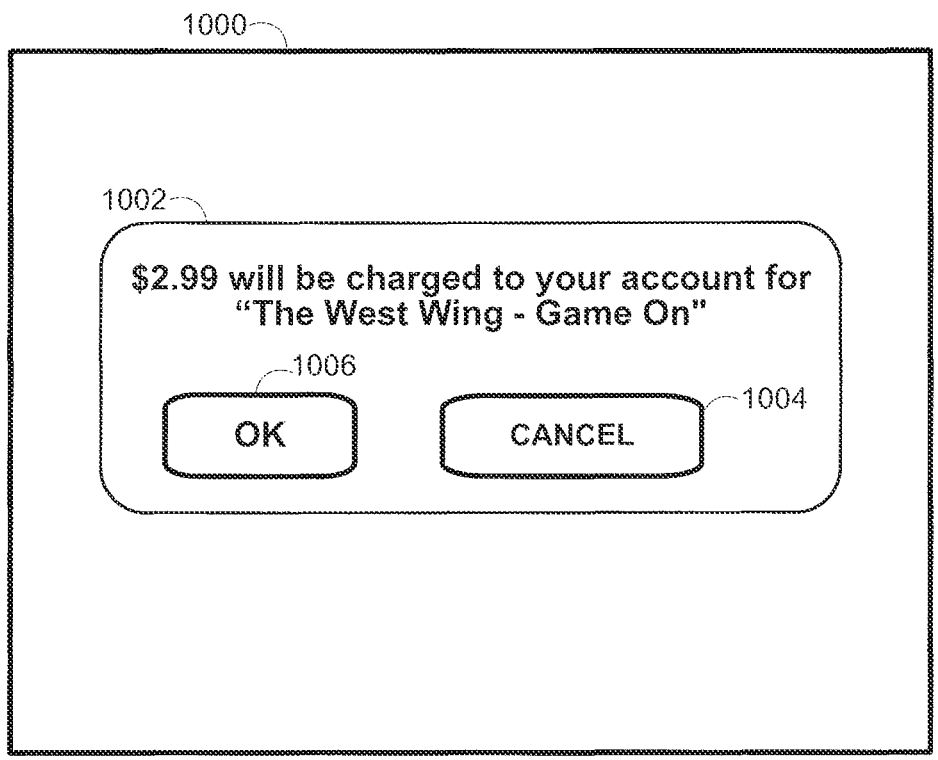
FIG. 10 shows an illustrative display screen with a price prompt overlay that is displayed in response to receiving a download command for a video in accordance with one embodiment of the invention.

Referring back to FIG. 8, the user may select choice 808 to download the video from a website. In response to the user selecting choice 808, the interactive media guidance application may display a price prompt overlay if accessing the video requires a fee. For example, FIG. 10 shows an illustrative display screen with a price prompt overlay that is displayed in response to receiving a download command for a video in accordance with one embodiment of the invention. Display screen 1000 may include price prompt overlay 1002, which provides the user with the cost for accessing the video. For example, as shown in FIG. 10, the user may download "The West Wing—Game On" from an Internet website for $2.99. If the user decides not to download the video, the user may select "CANCEL" option 1004 to cancel the download. The interactive media guidance application may then go back to providing the recording choices on display screen 800 (FIG. 8).

In response to the user selecting "OK" option 1006, the interactive media guidance application may send an instruction (e.g., to the media source) to charge $2.99 to the user's account. The interactive media guidance application may then begin to download the video. For example, the interactive media guidance application may send a request for the video to the media source. After the request has been authenticated by the media source, a FTP upload module on the media source (e.g., FTP upload module 204 of FIG. 2) may deliver the video directly to the user equipment (e.g., user equipment 110 of FIG. 1). In some embodiments, the video may be saved on the recording device (e.g., recording device 118 of FIG. 1).

Figure 11:
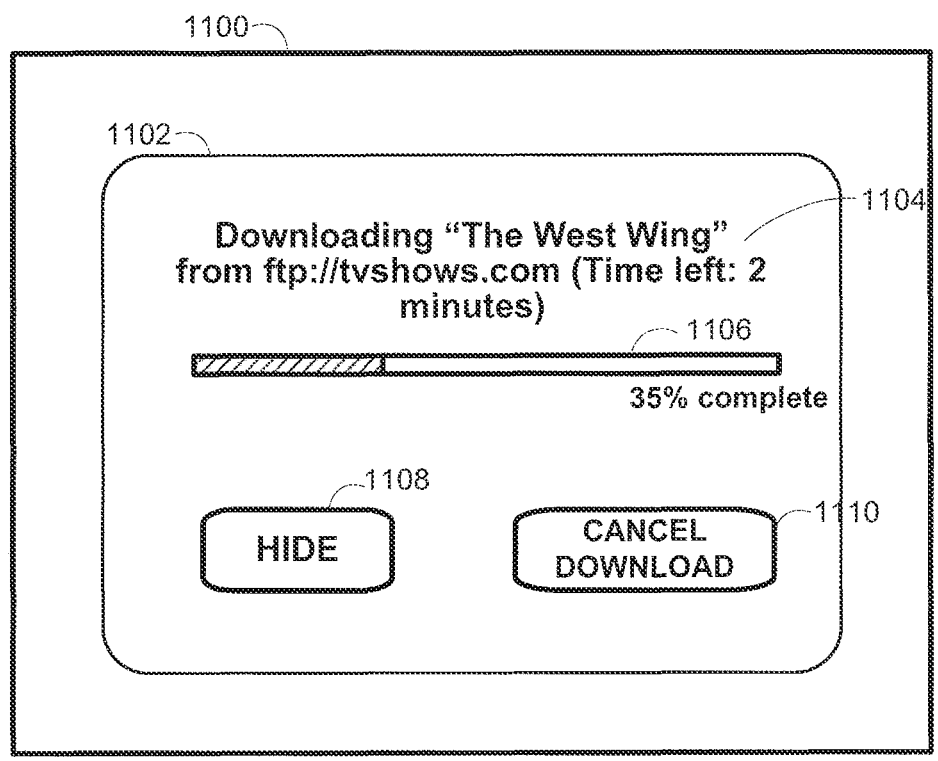
FIG. 11 shows an illustrative display screen with a downloading prompt overlay that is displayed while downloading a video in accordance with one embodiment of the invention.

FIG. 11 shows an illustrative display screen with a downloading prompt overlay that is displayed while downloading a video in accordance with one embodiment of the invention. Display screen 1100 may include downloading prompt overlay 1102 for providing the status of the download. As shown in FIG. 11, message 1104 indicates that the estimated time left for the download to complete is 2 minutes. The interactive media guidance application may also display status bar 1106, which provides a visual indication of the current download status. Downloading prompt overlay 1102 may also include "HIDE" option 1108. In response to the user selecting "HIDE" option 1108, the interactive media guidance application may hide downloading prompt overlay 1102, and the download may continue in the background. Thus, the user may perform other tasks on the user equipment (e.g., watch other videos or live television) without being required to wait for the video to download.

Downloading prompt overlay 1102 may further include "CANCEL DOWNLOAD" option 1110. In response to the user selecting "CANCEL DOWNLOAD" option 1110, the interactive media guidance application may stop the download, and, in some embodiments, delete the portion of the video that has already been downloaded to the recording device.

Figure 12:
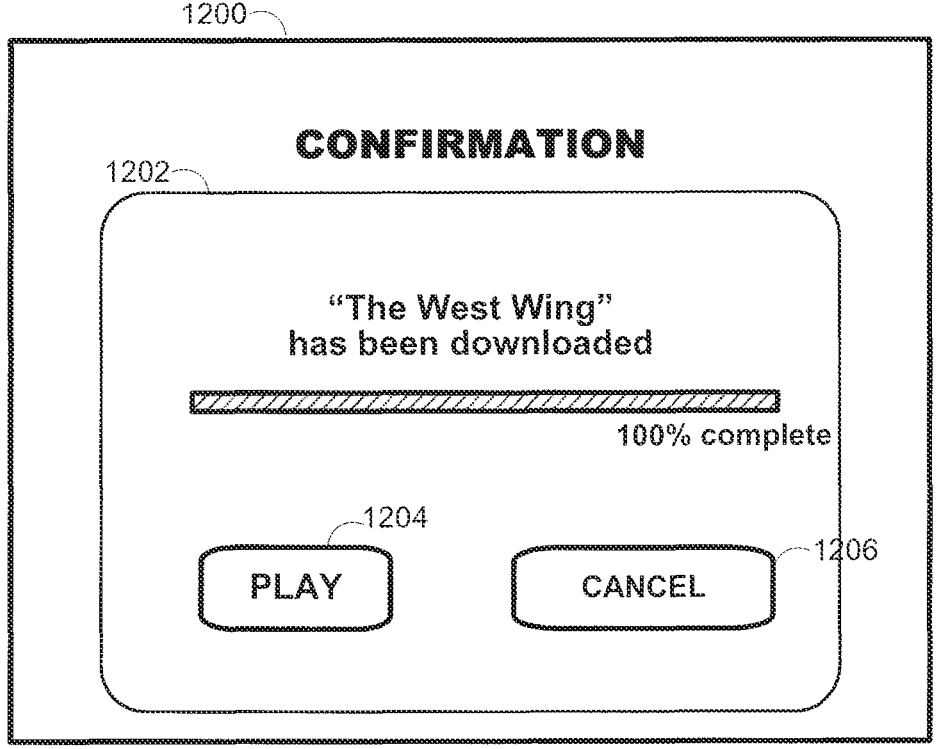
FIG. 12 shows an illustrative display screen with a confirmation prompt overlay that is displayed when a video has finished downloading in accordance with one embodiment of the invention.

FIG. 12 shows an illustrative display screen with a confirmation prompt overlay that is displayed when a video has finished downloading in accordance with one embodiment of the invention. Once the video has finished downloading, the interactive media guidance application may display confirmation prompt overlay 1202. In response to the user selecting "PLAY" option 1204, the interactive media guidance application may begin playing the downloaded video. In response to the user selecting "CANCEL" option 1206, the interactive media guidance application may remove confirmation prompt overlay 1202 and allow the user to watch the downloaded video at a later time.

In some embodiments, if the downloading prompt overlay 1102 had been hidden, the interactive media guidance may display a pop-up alerting the user that the download has completed. For example, in order to avoid interrupting the user's viewing experience, the interactive media guidance application may display a small message alert on the periphery or the display screen. The user may then select an option (e.g., selecting a "SELECT" cursor key on the remote control) to access the downloaded video. If, however, the user does not select the option after a period of time, the message alert map automatically disappear. The user may then select to watch the downloaded video later by accessing a recorded video listings (e.g., recorded video listings 402 of FIG. 5). In some embodiments, instead of downloading the video, the video may also be streamed directly from the media source. In other embodiments, if content control tags allows the video to be buffered, the video may be streamed at least partially into a buffer first before being made available to the user. It will be understood that, in some embodiments, in response to a user selecting a choice (e.g., choice 808 of FIG. 8) to obtain a video from an on-demand source, the interactive media guidance application may set a bookmark reference to the content in a recordings list.

Referring back to FIGS. 7 and 8, in response to the user selecting either "edit merge settings" option 714 or "edit merge settings" option 810, the interactive media guidance application may allow the user to set up options associated with merging and re-recording videos.

Figure 13:
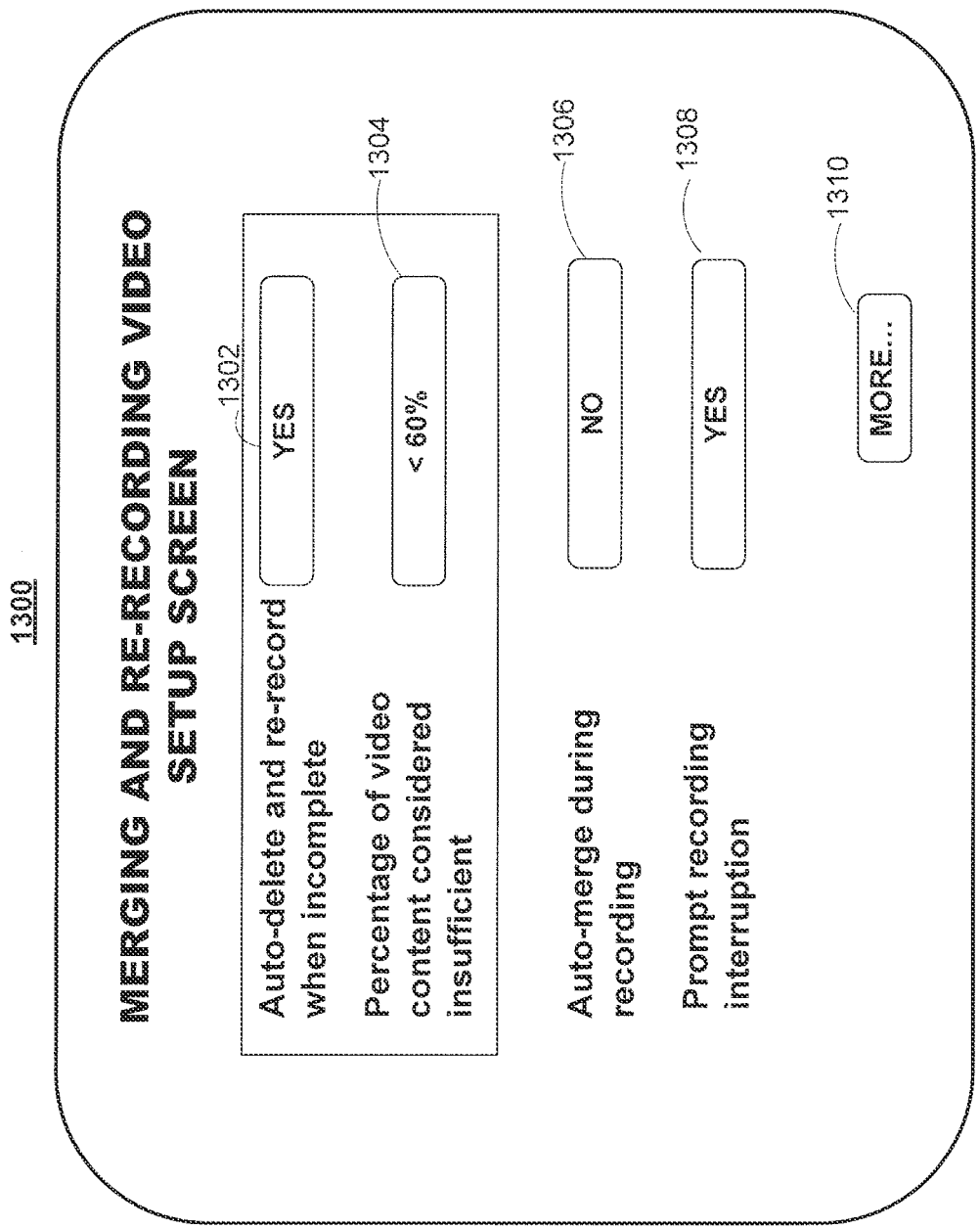
FIG. 13 shows an illustrative merging and re-recording video setup display screen in accordance with one embodiment of the invention.

FIG. 13 shows an illustrative merging and re-recording video setup display screen in accordance with one embodiment of the invention. Display screen 1300 may include "delete" options 1302 and 1304. "Delete" option 1302 may allow the user to specify whether to auto-delete a recording if the video content of the recording is insufficient. For example, if "delete" option 1302 is set to "YES", the interactive media guidance will automatically delete the recording if the video content is determined to be insufficient. In addition to deleting the recording, choices for recording the video again may also be provided. If, however, "delete" option 1302 is set to "NO", then a "delete" and/or a "delete and re-record" option may be provided for the user (e.g., "delete" option 708 and "delete and re-record" option 710 of FIG. 7).

"Delete" option 1304 may allow the user to define a parameter below which the amount of video content recorded is considered to be insufficient. In the example shown in FIG. 13, this parameter is set to 60%. Thus, if the recorded video content is below 60% and "delete" option 1302 is set to "YES", the video will be automatically deleted.

"Auto-merge" option 1306 may allow the user to specify whether to automatically merge segments of the same program to form a single recording. As shown in FIG. 13, "auto-merge" option 1306 is set to "YES." Thus, the interactive media guidance application may automatically merge separately recorded segments of the same program together to form a single recording (e.g., as shown in FIG. 5). In some embodiments, the interactive media guidance application may attempt to detect the presence of a previously recorded segment of video. After locating the segment, the interactive media guidance application may automatically record the video following the end of the segment to form a single recording.

If "auto-merge" option 1306 is set to "NO", the interactive media guidance application may record a second segment of the video after a recording interruption (e.g., a system failure). The interactive media guidance application may then prompt the user regarding whether to merge segments of the video to form a single recording. This process will be described in more detail in connection with FIG. 15.

"Prompt recording interruption" 1308 may allow the user to specify whether to display an alert for recording interruptions. For example, the user may set "prompt recording interruption" 1308 to "NO" if the user prefers not to be alerted to recording interruptions. Thus, if "prompt recording interruption" 1308 is set to "NO," the interactive media guidance application will not alert the user to the recording interruption.

Figure 14:
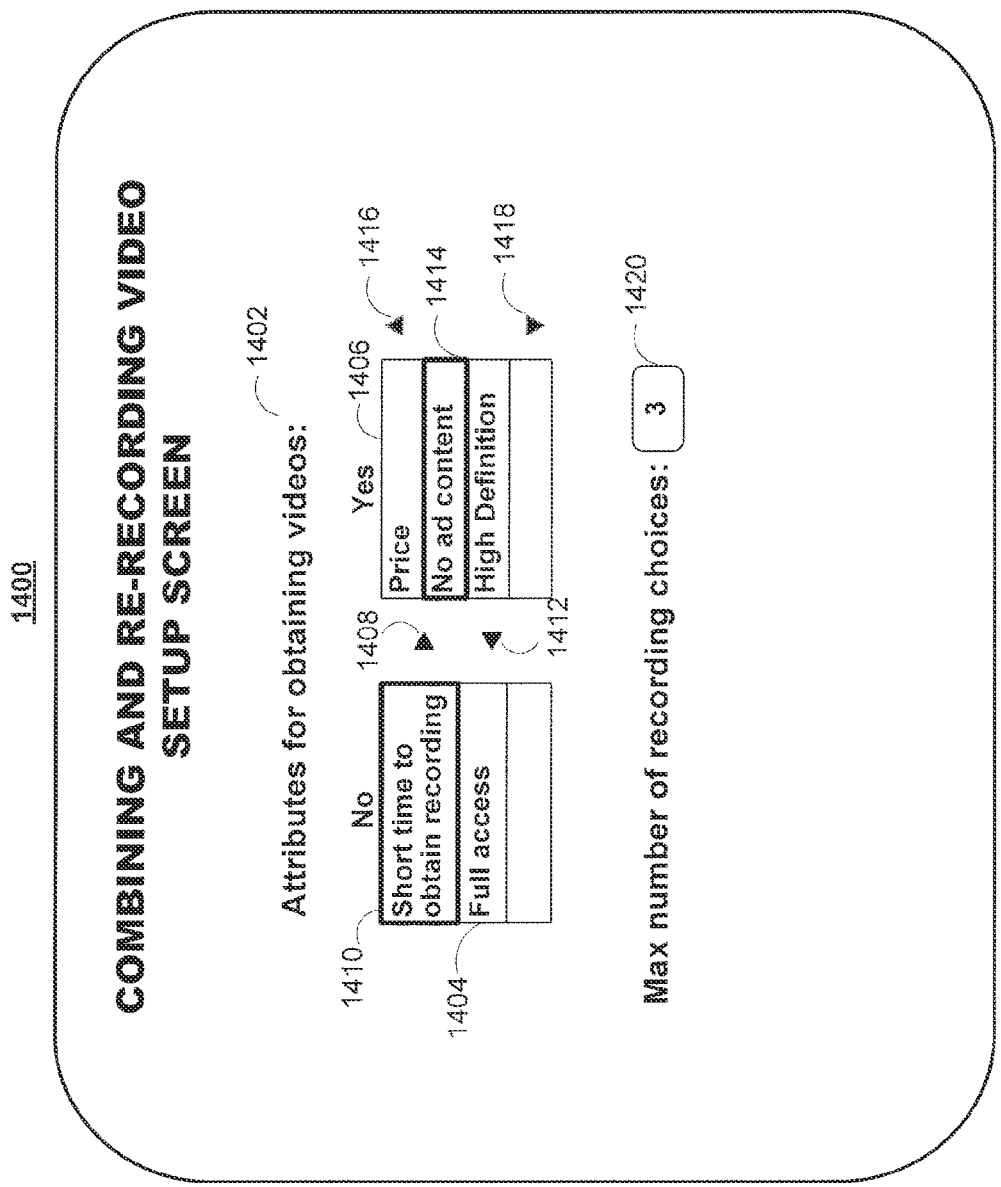
FIG. 14 shows another illustrative merging and re-recording video setup display screen in accordance with one embodiment of the invention.

In some embodiments the user may select "MORE" option 1310 to view more merging and re-recording video-setup options. For example, FIG. 14 shows another illustrative merging and re-recording video setup display screen in accordance with one embodiment of the invention. As shown in FIG. 14, option 1402 may allow the user to select and rank attributes for obtaining videos of a recording. Based on the ranked attributes, the interactive media guidance application may provide appropriate recording choices to the user.

The user may select arrow 1408 to move a listing highlighted by highlight region 1410 from "NO" list 1404 to "YES" list 1406. The user may also select arrow 1412 to move a listing highlighted by highlight region 1414 from "YES" list 1406 to "NO" list 1404. In addition, the user may rank the attributes by moving one or more listings in "YES" list 1406. For example, the user may move a highlighted listing up by selecting arrow 1416. As another example, the user may move a highlighted listing down by selecting arrow 1418. As shown in FIG. 14, the user has selected "low price", "no ad content", and "high-definition" as attributes to use for obtaining new recordings. The user has not selected "short time to obtain a recording" or "full access" as attributes. Thus, the interactive media guidance application may provide recording choices with attributes that match at least one of "low price", "no ad content", or "high-definition".

In some cases, the interactive media guidance application may not find a recording choice that satisfies all of the attributes. Thus, the interactive media guidance application may rank the recording choices based on the number and the extent of attributes that are satisfied. For example, the interactive media guidance application may suggest a free or relatively low priced recording choice even if the recording choice is not HD. As another example, the interactive media guidance application may rank a recording choice that includes movie previews higher than a recording choice that includes advertising content. Persons skilled in the art will appreciate that any suitable parameter may be used to rank the recording choices. Persons skilled in the art will also appreciate that the interactive media guidance application may use any suitable algorithm for determining the rankings of the recording choices.

The interactive media guidance application may initially provide a fixed number of recording choices to the user. For example, as shown in FIG. 14, maximum number of choices 1420 is currently set to "3". Thus, the interactive media guidance application may provide three recording choices on a recording choices overlay (e.g., choices 804, 806, and 808 on recording choices overlay 802 of FIG. 8). The user may increase or decrease the maximum number of recording choices 1420 by selecting "UP" and "DOWN" cursor keys on a user input device (e.g., user input device 114 of FIG. 1). In some embodiments, if the recording choices that are available exceed the maximum number, the user may request to view those recording choices (e.g., by selecting "more" option 812 of FIG. 8).

Referring back to FIG. 13, in response to the user setting "auto-merge" option 1306 to "NO", the interactive media guidance application may not automatically merge segments of the same program to form a single recording. Instead, the interactive media guidance application may prompt the user regarding whether to merge the segments. The interactive media guidance application may then merge the segments in response to a user input.

Figure 15:
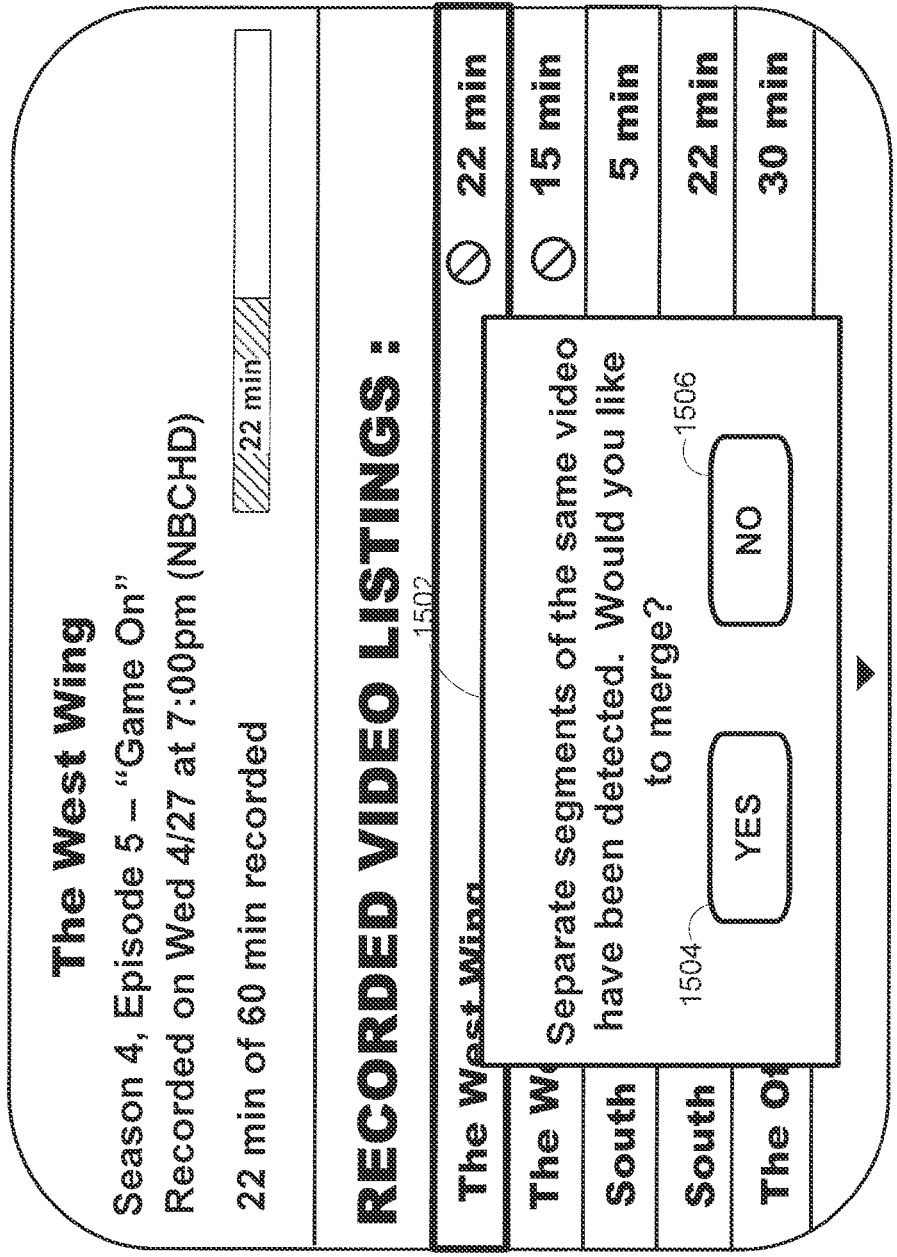
FIG. 15 shows an illustrative recorded video listing display screen with a prompt overlay for merging segments of video in accordance with one embodiment of the invention.

FIG. 15 shows an illustrative recorded video listing display screen with a prompt overlay for merging segments of video in accordance with one embodiment of the invention. Display screen 1500 may include prompt overlay 1502 for notifying the user that segments of the same program are detected. Prompt overlay 1502 may include "YES" option 1504 and "NO" option 1506. In response to the user selecting "YES" option 1504, the interactive media guidance application may merge the segments of the video to form a single recording. After merging the segments of the video, the interactive media guidance application may display a display screen similar to display screen 500 of FIG. 5. In some embodiments, in addition to detecting segments of the last video recorded, the interactive media guidance application may also detect multiple segments of all videos currently stored on the recording device (e.g., recording device 118 of FIG. 1). Thus, in response to the user selecting to merge the segments, the interactive media guidance application may merge the multiple segments of each video.

Figure 16:
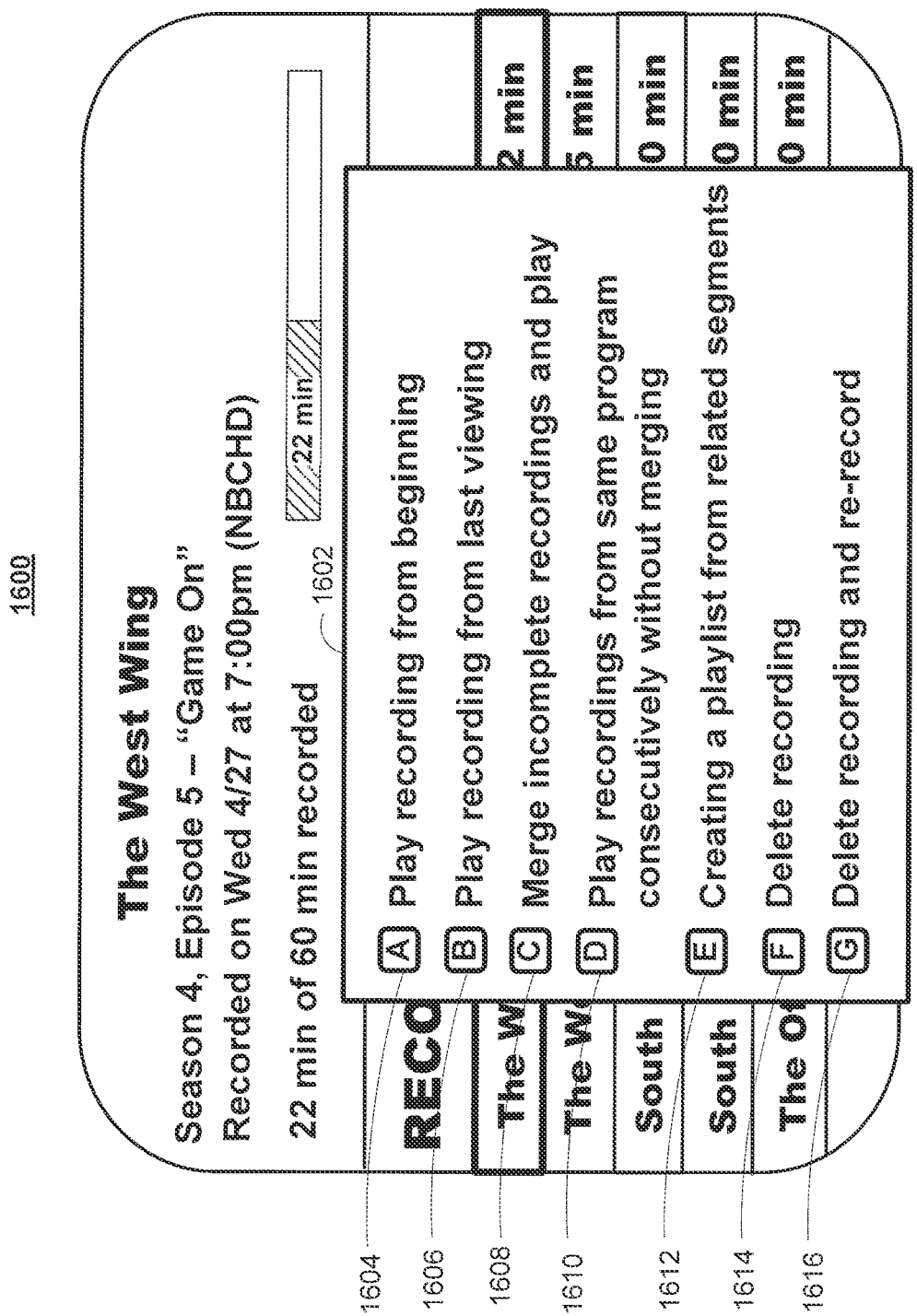
FIG. 16 shows an illustrative recorded video listing display screen in response to receiving a selection of a recording in accordance with one embodiment of the invention.

It the user selects "NO" option 1506, the interactive media guidance application may remove prompt overlay 1502, and provide the recorded video listings to the user without any changes. If the user then selects an incomplete and/or corrupted recording in the recorded video listing, the interactive media guidance application may display multiple options associated with the recording. For example, FIG. 16 shows an illustrative recorded video listing display screen in response to receiving a selection of a recording in accordance with one embodiment or the invention.

Display screen 1600 may include overlay 1602 for providing multiple options to the user. The multiple options may include any suitable type of options such as, for example, options for playing a recording from the beginning (e.g., "playback" option 1604), playing a recording from the last viewing position (e.g., "playback" option 1606), merging separate recordings and playing the recording (e.g., "merge and playback" option 1608), playing recordings without merging (e.g., "playback without merging" option 1610), creating a playlist from related segments (e.g., "playlist" option 1612), deleting a recording (e.g., "delete" option 1614), and deleting a recording and re-recording (e.g., "delete and re-record" option 1616). It will be understood that "playback" options 1604 and 1606, "delete" option 1614, and "delete and re-record" option 1616 may be the same as or similar to "playback" options 604 and 606, "delete" option 610, and "delete and re-record" option 612 of FIG. 6, respectively.

In response to the user selecting "merge and playback" option 1608, the interactive media guidance application may merge segments of the video. After merging the segments into a single recording, the interactive media guidance application may play back the recording.

In response to the user selecting "playback without merging" option 1610, the interactive media guidance application may initiate the playback of the selected recording. After the selected recording has finished playing, the application may locate the second recording and immediately begin to play back the second recording. This process may continue until all recordings from the same program have been played back. As a result, the user may still watch the separately recorded segments from the same program without merging the segments or having to play each segment individually. Persons skilled in the art will appreciate that in response to the user selecting any of the playback options (options 1604, 1606, 1608, and 1610), the interactive media guidance application may provide prompt overlay 704 (FIG. 7) to the user.

In response to the user selecting "playlist" option 1612, the interactive media guidance application may create a playlist that includes segments of video that are determined to be related. In some embodiments, after creating the playlist, the interactive media guidance application may provide an option for sequentially playing back the segments in the playlist.

Figure 17:
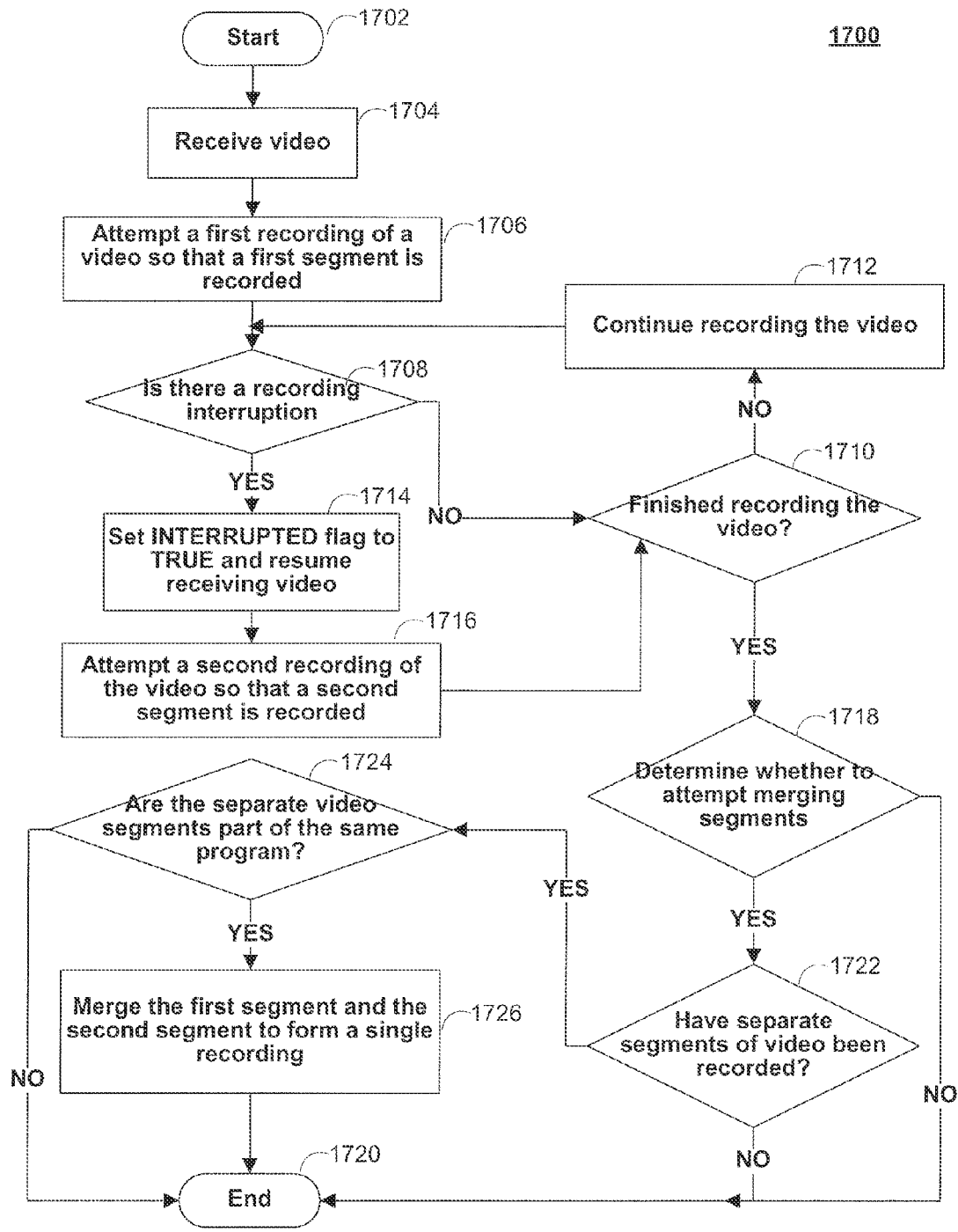
FIG. 17 shows a flowchart of an illustrative process for merging segments of the same program in accordance with one embodiment of the invention.

FIG. 17 shows a flowchart of an illustrative process for merging segments of the same program in accordance with one embodiment of the invention. Process 1700 starts at step 1702.

At step 1704, the interactive media guidance application may receive video. At step 1706, the interactive media guidance application may attempt a first recording of the video so that a first segment of the video is recorded. For example, the user may have previously scheduled the video for recording by selecting to record the videos in a broadcast video listing. As another example, the user may have selected to record the video while watching the video. After attempting the first recording, process 1700 moves to step 1708.

At step 1708, the interactive media guidance application may determine whether a recording interruption has been detected. Any suitable type of recording interruptions may be detected, such as, for example, a system failure (e.g., interruption of a transmission of the video, an equipment failure, or a power failure), an emergency alert that occurs during the recording, a corrupted first segment of video, or an inadvertent recording interruption caused by a user. If, at step 1708, the interactive media guidance application determines that a recording interruption has not been detected, process 1700 moves to step 1710.

At step 1710, the interactive media guidance application may determine whether it has finished recording the video. If, at step 1710, the interactive media guidance application determines that it has not finished recording the video, process 1700 moves to step 1712.

At step 1712, the interactive media guidance application may continue to record the video, and, at step 1708, the application may continue to detect recording interruptions.

If, at step 1708, the interactive media guidance application instead determines that a recording interruption has been detected, process 1700 moves to step 1714. At step 1714, the interactive media guidance application sets "INTERRUPTED" flag to TRUE and then may resume receiving video, potentially after a delay due to the interruption. Process 1700 then moves to step 1716.

At step 1716, the interactive media guidance application may re-attempt a recording or the video This may result in a second segment of the video being recorded. Step 1716 may be initiated if any recording has been scheduled for that specific time (regardless of whether the recording is the same program as the program in the first segment). Alternatively, step 1716 may be initiated as a result of sensing the INTERRUPTED flag is set to TRUE. Process 1700 then moves to step 1710.

At step 1710, the application may determine if it has finished recording the video. If, at step 1710, the interactive media guidance application determines that it has not finished recording the video, process 1700 moves to step 1712, discussed previously.

If, at step 1710, the interactive media guidance application instead determines that it has finished recording the video, process 1700 moves to step 1718. At step 1718, the interactive media guidance application may determine whether it should attempt to merge segments into a single recording. For example, the interactive media guidance application may check the state of the INTERRUPTED flag. As another example, the interactive media guidance application may determine if a user input directing the application to merge multiple video segments has been received. If, at step 1718, the interactive media guidance application determines that there is no reason to attempt to merge video segments, process 1700 ends at step 1720.

If, at step 1718, the interactive media guidance application instead determines that there is a reason to attempt to merge video segments, process 1700 moves to step 1722. For example, the application may have detected a recording interruption at step 1706. As another example, the user may have selected "YES" option 1504 of FIG. 15 or "merge and playback" option 1608 of FIG. 16.

At step 1722, the interactive media guidance application may determine whether separate segments of video have been recorded. For example, the interactive media guidance application may compare data associated with the segments (e.g., the name, the subname, the description, the video identifier, the series identifier, and/or the broadcast time of the videos) to determine if the segments are incomplete or fragments. As another example, the interactive media guidance application may compare media cues in the segments. If, at step 1722, the interactive media guidance application determines that separate segments have not been recorded, process 1700 ends at step 1720. For example, the video may have already finished broadcasting by the time that the recording interruption ended, and a second segment of video was not recorded.

If, at step 1722, the interactive media guidance application instead determines that separate segments have been recorded, process 1700 moves to step 1724. At step 1724, the interactive media guidance application may determine whether the recordings are segments of the same program. If, at step 1724, the interactive media guidance application determines that the recordings are not segments of the same program, process 1700 ends at step 1720.

If, at step 1724, the interactive media guidance application instead determines that the recordings are segments of the same program, process 1700 moves to step 1726. At step 1726, the interactive media guidance application may merge the segments to form a single recording. For example, the interactive media guidance may logically append the segments by determining when each segment was recorded, and appending the segments in the proper chronological order.

After merging the first and second segments, process 1700 ends at step 1720. Although process 1700 has been described in terms of two recorded segments of video, this process may be generalized to include any suitable number of segments.

Figure 18:
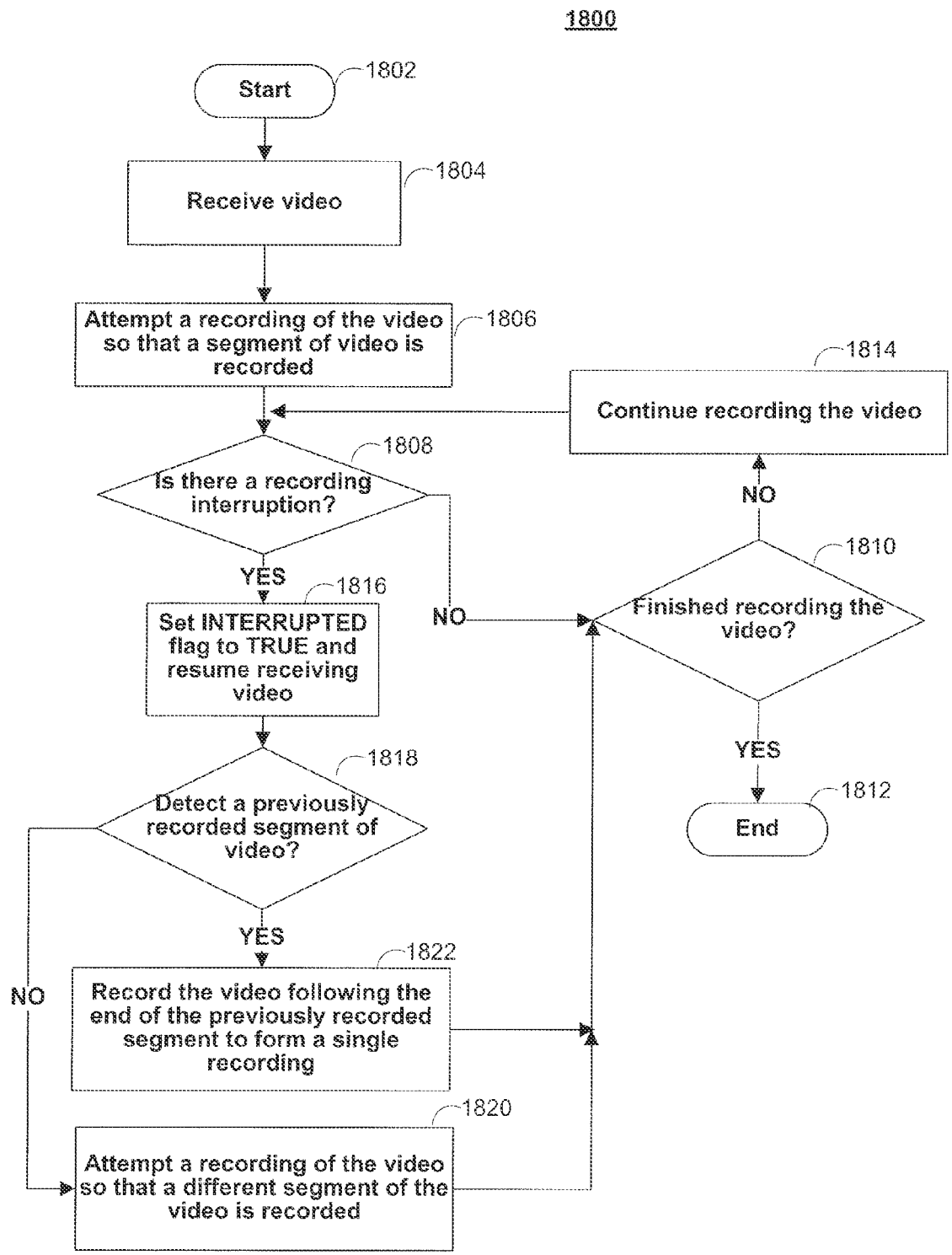
FIG. 18 shows a flowchart of an illustrative process for automatically recording video after a previously recorded segment of the video in accordance with one embodiment of the invention.

FIG. 18 shows a flowchart of an illustrative process for automatically recording video after a previously recorded segment of the video in accordance with one embodiment of the invention. Process 1800 starts at step 1802.

At step 1804, the interactive media guidance application may receive video from a media source. For example, the interactive media guidance application may receive video from a cable source.

At step 1806, the interactive media guidance application may attempt a recording of the video so that a segment of the video is recorded. After initiating the recording, process 1800 moves to step 1808.

At step 1808, the interactive media guidance application may determine if a recording interruption has been detected. If, at step 1808, the interactive media guidance application determines that a recording interruption has not been detected, process 1800 moves to step 1810.

At step 1810, the interactive media guidance application may determine whether it has finished recording the video. If, at step 1810, the interactive media guidance application determines that it has finished recording the video, process 1800 ends at step 1812. If, at step 1810, the interactive media guidance application instead determines that it has not finished recording the video, process 1800 moves to step 1814.

At step 1814, the interactive media guidance application may continue to record the video, and, at step 1808, the application may continue to detect recording interruptions.

If, at step 1808, the interactive media guidance application instead determines that a recording interruption has been detected, process 1800 moves to step 1816. At step 1816, the interactive media guidance application may note the interruption by setting an INTERRUPTED flag to TRUE and resume the reception of video. Process 1800 then moves to step 1818.

At step 1818, the interactive media guidance application may detect a previously recorded segment or the video. Step 1818 may be initiated if any recording has been scheduled for that specific time (regardless of whether the recording is the same program as the video in the previously recorded segment). The interactive media guidance application may detect the previously recorded segment by, for example, comparing data associated with the video and the recorded segment (e.g., the name, the subname, the description, the video identifier, the series identifier, and/or the broadcast time of the videos). As another example, the interactive media guidance application may compare media cues in the video and the recorded segment. If, at step 1818, the interactive media guidance application has not detected a previously recorded segment of the video, process 1800 moves to step 1820. For example, the video may have already finished broadcasting by the time that the recording interruption ended.

At step 1820, the interactive media guidance application may attempt a recording of the video so that a different segment of the video is recorded. After attempting the recording, process 1800 moves to step 1810, discussed previously.

Referring back to step 1818, if the interactive media guidance application instead detects a previously recorded segment of the video, process 1800 moves to step 1822. At step 1822, the interactive media guidance application may record the video following the end of the previously recorded segment to form a single recording. Process 1800 then moves to step 1810, discussed previously.

Figure 19A:
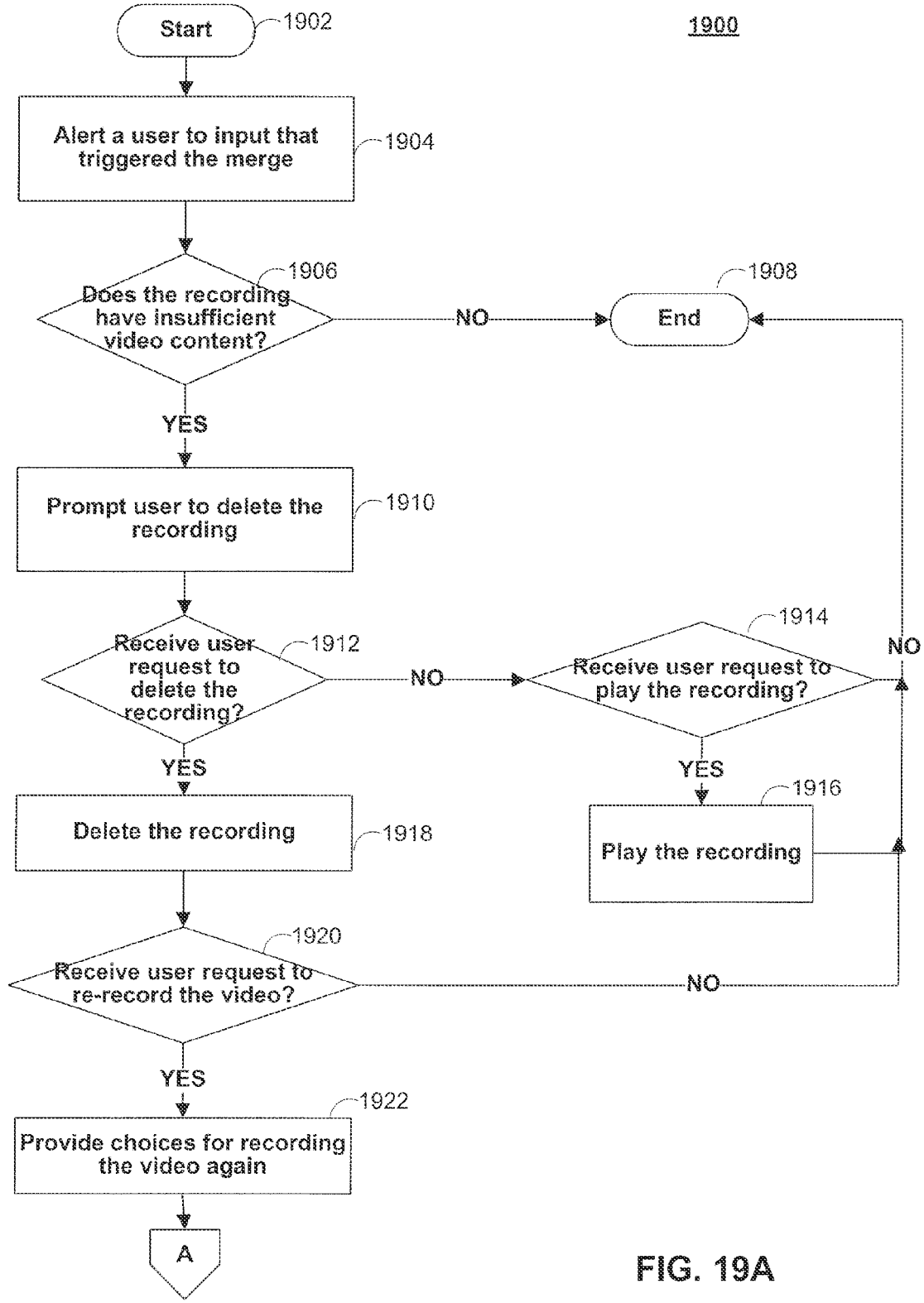
FIGS. 19A-19B show flowcharts of an illustrative process for alerting users to an input that triggered merging of video segments in accordance with one embodiment of the invention.
Figure 19B:
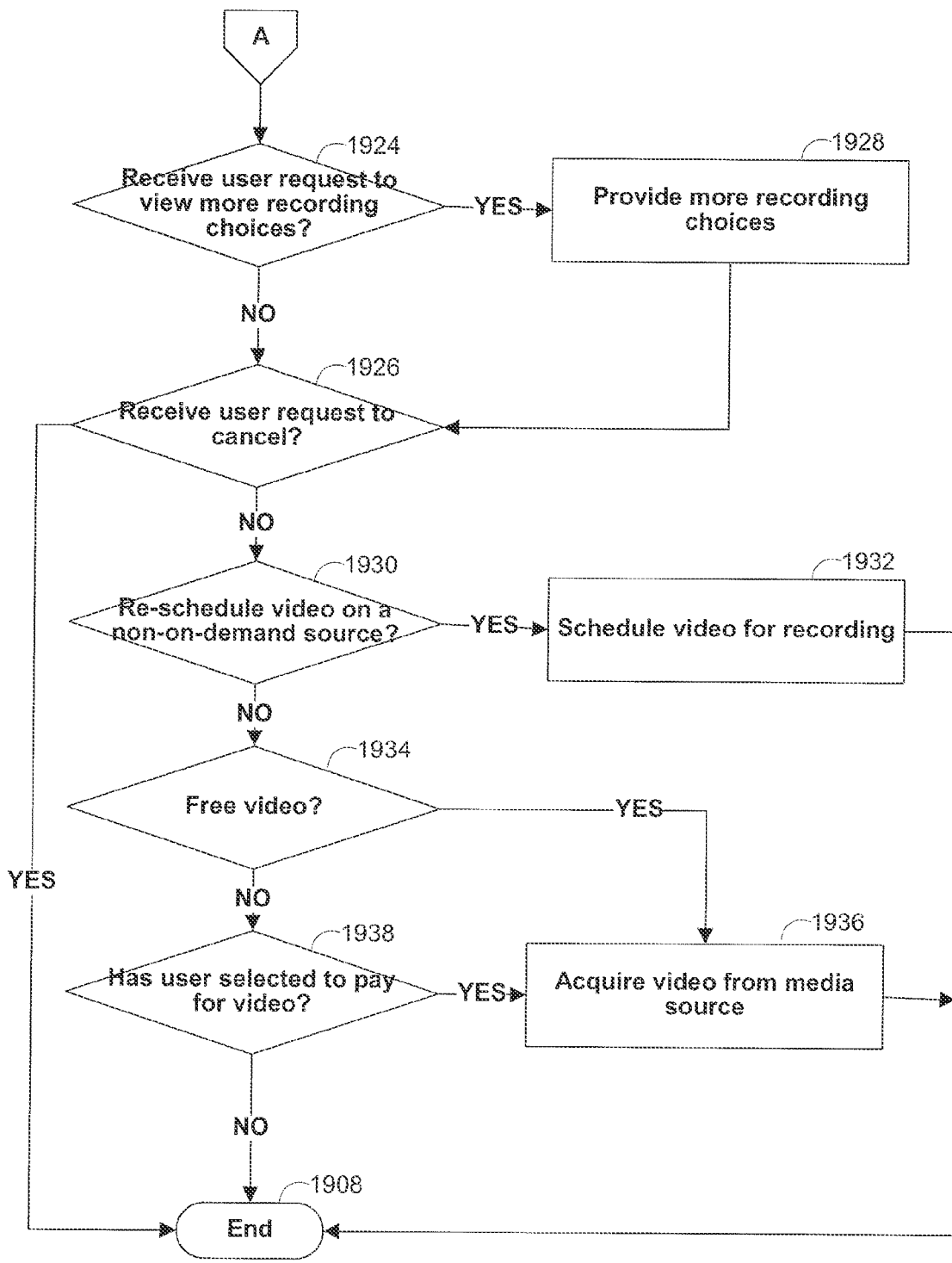

FIGS. 19A-19B show flowcharts of an illustrative process for alerting users to an input that triggered merging of video segments in accordance with one embodiment of the invention. Process 1900 starts at step 1902. At step 1904, the interactive media guidance application may alert the user to the input that triggered the merge (e.g., a recording interruption or a user input). For example, the interactive media guidance application may display prompt overlay 704 (FIG. 7), which may include information associated with a recording interruption or a user input. Process 1900 then moves to step 1906.

At step 1906, the interactive media guidance application may determine whether the recording has insufficient video content. For example, the interactive media guidance application may determine the amount of video content (e.g., portion of the video that excludes advertising content) that was not recorded. The interactive media guidance application may determine this amount by comparing the duration of the recording to the total duration of the video in its originally distributed form (e.g., based on metadata associated with the video), comparing the recording to a typical television broadcast, comparing the recording to a broadcast schedule provided by the media source, determining discontinuities in a program clock reference or frame or packet count in digital video, or any combination thereof. Once the amount of video content that has been recorded has been determined, the interactive media guidance application may determine whether the video content is sufficient based on one or more parameters. The parameters may be determined based on past user behavior, defined by the user, or any combination thereof. For example, the user may define the parameter by specifying a percentage of video content below which the recording should be deleted and re-recorded (e.g., the user may specify a percentage by selecting "delete" option 1404 of FIG. 14).

If, at step 1906, the interactive media guidance application determines that the recording has sufficient video content, process 1900 ends at step 1908. If, at step 1906, the interactive media guidance application instead determines that the recording has insufficient video content, process 1900 moves to step 1910.

At step 1910, the interactive media guidance application may prompt the user to delete the recording. For example, the interactive media guidance application may display "delete" option 708 (FIG. 7) and/or "delete and re-record" option 710 (FIG. 7). Process 1900 then moves to step 1912.

At step 1912, the interactive media guidance application may determine whether a user request to delete the recording has been received. For example, the user may nave selected either "delete" option 708 or "delete and re-record" option 710 to delete the recording. If, at step 1912, the interactive media guidance application determines that a user request to delete the recording has not been received, process 1900 moves to step 1914.

At step 1914, the interactive media guidance application may determine whether a user request to play the recording has been received. If, at step 1914, the interactive media guidance application determines that a user request to play the recording has been received, process 1900 moves to step 1916. For example, the user may have requested to play back the recording (e.g., "play" option 706 of FIG. 7).

At step 1916, the interactive media guidance application may play back the recording. Process 1900 then ends at step 1908.

If, at step 1914, the interactive media guidance application instead determines that a user request to play the recording has not been received, process 1900 ends at step 1908. For example, the user may have requested to cancel the selection of the recording (e.g., "cancel" option 712 of FIG. 7).

Referring back to step 1912, if the interactive media guidance application instead determines that a user request to delete the recording has been received, process 1900 moves to step 1918. At step 1918, the interactive media guidance application may delete the recording. For example, interactive media guidance application may remove the recording from the recording device (e.g., recording device 118 of FIG. 1). Process 1900 then moves to step 1920.

At step 1920, the interactive media guidance application may determine whether a user request to re-record the video has been received. If, at step 1920, the interactive media guidance application determines that a user request to re-record the video has not been received, process 1900 ends at step 1908. For example, the user many have selected "delete" option 708 of FIG. 7.

If, at step 1920, the interactive media guidance application instead determines that a user request to re-record the video has been received, process 1900 moves to step 1922. For example, the user may have selected "delete and re-record" option 710.

At step 1922, the interactive media guidance application may provide one or more choices for recording the video again. For example, the interactive media guidance application may provide a recording choices overlay (e.g., recording choices overlay 802 of FIG. 8) that includes multiple recording choices (e.g., choices 804, 806, and 808 of FIG. 8) for recording the video again. After providing the one or more recording choices, process 1900 moves to step 1924 of FIG. 19B.

At step 1924, the interactive media guidance application may determine whether the user has selected to view more recording choices. If, at step 1924, the interactive media guidance application determines that the user has not selected to view more recording choices, process 1900 moves to step 1926.

If, at step 1924, the interactive media guidance application instead determines that the user has selected to view more recording choices, process 1900 moves to step 1928. For example, the user may have selected "more" option 812 of FIG. 87.

At step 1928, the interactive media guidance application may provide a list of additional recording choices to the user. After providing those choices, process 1900 moves to step 1926.

At step 1926, the interactive media guidance application may determine whether the user has selected to cancel. If, at step 1926, the interactive media guidance application determines that the user has selected to cancel, process 900 ends at step 1908. For example, the user may have selected "cancel" option 814 of FIG. 8.

If, at step 1926, the interactive media guidance application instead determines that the user has not selected to cancel the interactive media guidance application, process 1900 moves to step 1930. At step 1930, the interactive media guidance application may determine whether the user has selected to re-schedule the video for recording on a non-on-demand source (e.g., a regular cable or satellite television channel). If, at step 1930, the interactive media guidance application determines that the user has selected to re-schedule the video on a non-on-demand source, process 1900 moves to step 1932. For example, the user may have selected choices 804 or 806 (FIG. 8) to schedule the video for re-recording.

At step 1932, the interactive media guidance application may schedule the video for recording. In some embodiments, the interactive media guidance may display a confirmation prompt to indicate that the video has been scheduled for recording (e.g., confirmation prompt overlay 902 of FIG. 9). Process 1900 then ends at step 1908.

If, at step 1930, the interactive media guidance application instead determines that the user has not selected to re-schedule the video on a non-on-demand source, process 1900 moves to step 1934. For example, the user may have selected choice 808 (FIG. 8) to download the video from an Internet source.

At step 1934, the interactive media guidance application may determine whether the video is free. If, at step 1934, the interactive media guidance application determines that the video is free, process 1900 moves to step 1936.

At step 1936, the interactive media guidance application may begin to acquire the video. For example, the interactive media guidance application may provide a downloading prompt overlay (e.g., downloading or prompt overlay 1102 of FIG. 11), which may allow the user to view the current status of the download. Once the download has completed, the interactive media guidance application may display a confirmation prompt overlay (e.g., confirmation prompt overlay 1202 of FIG. 12) to notify the user. Process 1900 then ends at step 1908.

If, at step 1934, the interactive media guidance application instead determines that the video is not free, process 1900 moves to step 1938.

At step 1938, the interactive media guidance application may determine whether the user has selected to pay for the video. For example, the interactive media guidance application may provide a price prompt overlay (e.g., price prompt overlay 1002 of FIG. 10) which includes the cost for acquiring the video. If, at step 1938, the interactive media guidance application determines that the user has selected to pay for the video, process 1900 moves to step 1936. For example, the user may have selected "OK" option 1006 (FIG. 9). The interactive media guidance application may then begin to acquire the video.

If, at step 1932, the interactive media guidance application instead determines that the user has not selected to pay for the video, process 1900 ends at step 1908. For example, the user may have selected "CANCEL" option 1004 (FIG. 10). The interactive media guidance application may then go back to displaying the recording choices (e.g., on recording choices overlay 802 of FIG. 8) or return to a different display screen.

The above described embodiments of the invention are presented for purposes of illustration and not of limitation, and the present invention is limited only by the claims which follow.

What is claimed is:

1. A method for displaying media asset listings at a user equipment, comprising:
    recording a segment of a first media asset;
    determining that the segment is an incomplete recording of the first media asset;
    searching a database of media asset listings to identify a first media asset listing corresponding to a first time that the first media asset will be made available again in the future and a second media asset listing corresponding to a second time that the first media asset will be made available again in the future;
    comparing the first time to a third time when a second media asset is scheduled to be recorded at the user equipment to determine whether the first time overlaps the third time;
    comparing the second time to the third time to determine whether the second time overlaps the third time;
    in response to determining that the first time overlaps the third time and the second time does not overlap the third time, automatically ranking the second media asset listing above the first media asset listing in a listing order;
    in response to determining that the second time overlaps the third time and the first time does not overlap the third time, automatically ranking the first media asset listing above the second media asset listing in the listing order; and
    generating a list for displaying the first media asset listing and the second media asset listing in the listing order, wherein a future recording has not been scheduled for an instance of the first media asset corresponding to the first media asset listing and the second media asset listing.

2. The method of claim 1, wherein the determining that the segment is an incomplete recording of the first media asset is made upon detecting that a system failure occurred.

3. The method of claim 1, wherein the listing order is further based on a source of the first media asset listing and a source of the second media asset listing.

4. The method of claim 1 further comprising:
    calculating an amount of the first media asset included in the segment;
    determining whether the calculated amount is lower than a threshold value; and
    automatically deleting the segment from the user equipment upon determining that the calculated amount is lower than the threshold value.

5. The method of claim 1, wherein the searching further comprises determining whether the database includes media asset listings with data corresponding to the data associated with the recorded segment.

6. The method of claim 1, wherein recording the segment of the first media asset further comprises:
    recording a first portion of the first media asset;
    determining that the first portion is an incomplete recording;
    recording a second portion of the first media asset upon determining that first portion is an incomplete recording of the first media asset; and
    merging the first and the second portions to form the segment.

7. The method of claim 1, wherein determining that the segment is an incomplete recording of the first media asset comprises comparing a duration of the segment to the duration of the first media asset based on data associated with the first media asset.

8. The method of claim 6, wherein the first and second portions are recorded from different sources.

9. The method of claim 6, wherein merging at least the first and second portions to form the segment comprises concatenating the second portion to an end of the first portion.

10. The method of claim 6, wherein merging at least the first and second portions to form the segment comprises deleting a listing for the first or second portions from a recorded media asset listing.

11. A system for displaying media asset listings at a user equipment, the system comprising control circuitry configured to:
   record a segment of a first media asset;
   determine that the segment is an incomplete recording of the first media asset;
   search a database of media asset listings to identify a first media asset listing corresponding to a first time that the first media asset will be made available again in the future and a second media asset listing corresponding to a second time that the first media asset will be made available again in the future;
   compare the first time to a third time when a second media asset is scheduled to be recorded at the user equipment to determine whether the first time overlaps the third time;
   compare the second time to the third time to determine whether the second time overlaps the third time;
   in response to determining that the first time overlaps the third time and the second time does not overlap the third time, automatically rank the second media asset listing above the first media asset listing in a listing order;
   in response to determining that the second time overlaps the third time and the first time does not overlap the third time, automatically rank the first media asset listing above the second media asset listing in the listing order; and
   generate a list for displaying the first media asset listing and the second media asset listing in the listing order, wherein a future recording has not been scheduled for an instance of the first media asset corresponding to the first media asset listing and the second media asset listing.

12. The system of claim 11, wherein the control circuitry configured to determine that the segment is an incomplete recording of the first media asset is further configured to make the determination upon detecting that a system failure occurred.

13. The system of claim 11, wherein the listing order is further based on a source of the first media asset listing and a source of the second media asset listing.

14. The system of claim 11, wherein the control circuitry is further configured to:
   calculate an amount of the first media asset included in the segment;
   determine whether the calculated amount is lower than a threshold value; and
   automatically delete the segment from the user equipment upon determining that the calculated amount is lower than the threshold value.

15. The system of claim 11, wherein the control circuitry configured to search is further configured to determine whether the database includes media asset listings with data corresponding to the data associated with the recorded segment.

16. The system of claim 11, wherein the control circuitry is further configured to:
   record a first portion of the first media asset;
   determine that the first portion is an incomplete recording;
   record a second portion of the first media asset upon determining that first portion is an incomplete recording of the first media asset; and
   merge the first and the second portions to form the segment.

17. The system of claim 11, wherein the control circuitry configured to determine that the segment is an incomplete recording of the first media asset is further configured to compare a duration of the segment to the duration of the first media asset based on data associated with the first media asset.

18. The system of claim 16, wherein the first and second portions are recorded from different sources.

19. The system of claim 16, wherein the control circuitry configured to merge at least the first and second portions to form the segment is further configured to concatenate the second portion to an end of the first portion.

20. The system of claim 16, wherein the control circuitry configured to merge at least the first and second portions to form the segment is further configured to delete a listing for the first or second portions from a recorded media asset listing.

* * * * *